US012592889B2

(12) United States Patent
Avnery

(10) Patent No.: US 12,592,889 B2
(45) Date of Patent: Mar. 31, 2026

(54) DENIAL OF SERVICE PROTECTION

(71) Applicant: Mellanox Technologies, Ltd., Yokneam (IL)

(72) Inventor: Yuval Avnery, Hahotrim (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 18/676,320

(22) Filed: May 28, 2024

(65) Prior Publication Data

US 2025/0373552 A1 Dec. 4, 2025

(51) Int. Cl.
| | |
|---|---|
| *H04L 47/12* | (2022.01) |
| *H04L 9/40* | (2022.01) |
| *H04L 43/0894* | (2022.01) |
| *H04L 43/16* | (2022.01) |
| *H04L 47/20* | (2022.01) |
| *H04L 47/2483* | (2022.01) |

(52) U.S. Cl.
CPC .......... *H04L 47/12* (2013.01); *H04L 43/0894* (2013.01); *H04L 43/16* (2013.01); *H04L 47/20* (2013.01); *H04L 47/2483* (2013.01); *H04L 63/1458* (2013.01)

(58) Field of Classification Search
CPC ..... H04L 47/12; H04L 43/0894; H04L 43/16; H04L 63/1458; H04L 47/20; H04L 47/2483
See application file for complete search history.

(56) References Cited

U.S. PATENT DOCUMENTS

| | | | | |
|---|---|---|---|---|
| 7,929,567 | B1* | 4/2011 | Alasti | H04W 72/566 |
| | | | | 455/452.2 |
| 8,509,074 | B1* | 8/2013 | Roberts | H04L 41/0895 |
| | | | | 370/232 |
| 9,769,074 | B2* | 9/2017 | DeCusatis | H04L 47/12 |
| 10,419,965 | B1* | 9/2019 | Kadosh | H04L 61/2592 |
| 10,944,695 | B2 | 3/2021 | Reynolds et al. | |
| 11,470,112 | B2 | 10/2022 | Gingold et al. | |
| 11,968,132 | B2* | 4/2024 | Johnsen | H04L 67/1097 |
| 2007/0237074 | A1* | 10/2007 | Curry | H04L 47/326 |
| | | | | 370/229 |
| 2008/0159135 | A1* | 7/2008 | Caram | H04L 47/31 |
| | | | | 370/468 |
| 2009/0147679 | A1* | 6/2009 | Gusat | H04L 47/562 |
| | | | | 370/232 |

(Continued)

FOREIGN PATENT DOCUMENTS

| | | |
|---|---|---|
| EP | 4105850 A1 | 12/2022 |

OTHER PUBLICATIONS

Extended European Search Report for Application No. 25178970.7, mailed Jun. 27, 2025, 10 pages.

*Primary Examiner* — Jerry B Dennison
(74) *Attorney, Agent, or Firm* — Davis Wright Tremaine LLP

(57) ABSTRACT

Apparatuses, systems, and techniques to monitor incoming data flows from a plurality of network sources and identify a data flow from any of the plurality of sources that exceeds a threshold value. In at least one embodiment, the data flow from any of the plurality of sources that exceeds the threshold value are rate-limited while the data flow from any of the plurality of sources that do not exceed the threshold value are passed through without any rate limiting.

22 Claims, 9 Drawing Sheets

(56) References Cited

U.S. PATENT DOCUMENTS

| | | | |
|---|---|---|---|
| 2013/0055373 A1* | 2/2013 | Beacham | H04L 47/29 |
| | | | 726/13 |
| 2014/0269319 A1* | 9/2014 | DeCusatis | H04L 47/12 |
| | | | 370/236 |
| 2015/0236968 A1* | 8/2015 | Zhang | H04L 43/16 |
| | | | 370/230 |
| 2015/0281085 A1* | 10/2015 | Phaal | H04L 47/12 |
| | | | 370/235 |
| 2015/0282180 A1* | 10/2015 | Owen | H04W 72/0453 |
| | | | 370/329 |
| 2016/0094450 A1* | 3/2016 | Ghanwani | H04L 47/821 |
| | | | 370/235 |
| 2017/0085501 A1* | 3/2017 | Utgikar | H04L 47/20 |
| 2017/0289048 A1* | 10/2017 | Chao | H04L 43/14 |
| 2018/0115501 A1* | 4/2018 | Reynolds | H04L 63/1416 |
| 2018/0205656 A1* | 7/2018 | Atli | H04L 47/30 |
| 2019/0014052 A1* | 1/2019 | Williams, Jr. | H04L 47/41 |
| 2019/0238461 A1* | 8/2019 | Miller | H04L 47/28 |
| 2021/0058330 A1 | 2/2021 | Mathew | |
| 2021/0288910 A1* | 9/2021 | Daly | H04L 47/24 |
| 2023/0397047 A1* | 12/2023 | Xu | H04L 47/11 |

* cited by examiner

100

Data Center  104

Internal Network  106

102

| 102C | 102B | 102A |

120 →

| 120C | 120B | 120A |

122 →

| 122C | 122B | 122A |

108    108

122 →

| 122F | 122E | 122D |

120 →

| 120F | 120E | 120D |

| 102F | 102E | 102D |

Network Gateway Device(s) 114

Tenant 1 128

Tenant Computing Device 112

Tenant 2 130

Tenant Computing Device 112

External Network 110

DATA CENTER
800

PROCESSOR 902

CACHE
904

REGISTER FILE
906

EXECUTION UNIT 908

PACKED INSTRUCTION
SET 909

PROCESSOR BUS 910

GRAPHICS/
VIDEO CARD
912

914

MEMORY
CONTROLLER
HUB
916

918

MEMORY 920

INSTRUCTION(S) 919

DATA 921

922

DATA
STORAGE
924

WIRELESS
TRANSCEIVER
926

FLASH BIOS
928

I/O
CONTROLLER
HUB
930

LEGACY I/O
CONTROLLER 923

USER INPUT AND
KEYBOARD
INTERFACES 925

SERIAL EXPANSION
PORT 927

AUDIO CONTROLLER
929

NETWORK
CONTROLLER
934

900

DENIAL OF SERVICE PROTECTION

TECHNICAL FIELD

At least one embodiment pertains to monitoring traffic flows to prevent or minimize Denial of Service (DOS) attacks on or within a computing system. For example, at least one embodiment pertains to detecting a DOS attack and/or halting a DOS attack.

BACKGROUND

A data center or similar computing environment may be used by multiple tenants. Successful Denial of Service (DOS) attacks by one or more tenants can significantly reduce available communication bandwidth of a computing system (e.g., to near zero). Unfortunately, it takes time to identify and/or halt a DOS attack. Detection of a DOS attacks and/or remedial actions that can halt a DOS attack may be improved.

BRIEF DESCRIPTION OF DRAWINGS

FIG. 1 is a block diagram illustrating an example system, in accordance with at least one embodiment;

DETAILED DESCRIPTION

Figure 2:
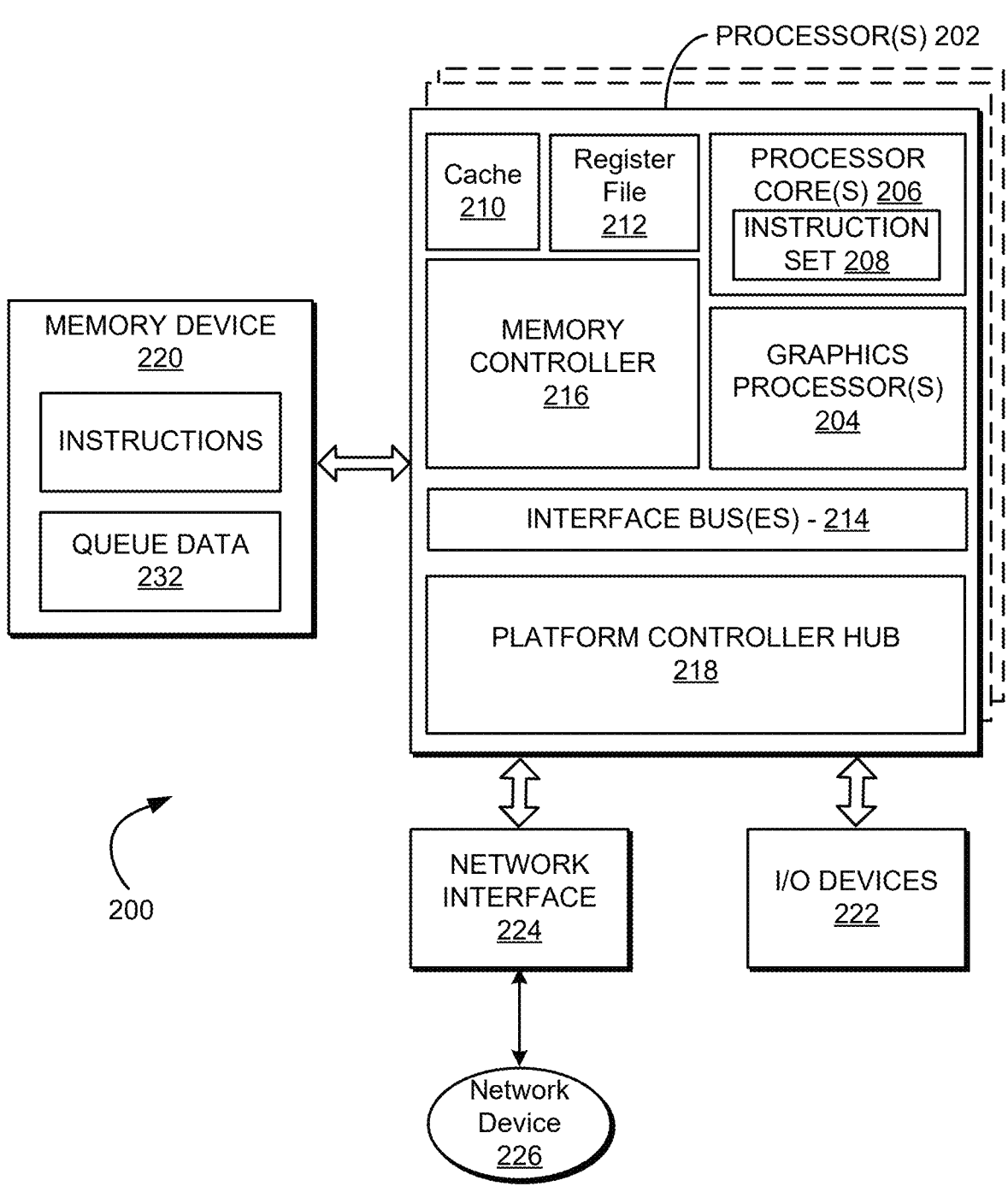
FIG. 2 is a block diagram illustrating an example processing system, in accordance with at least one embodiment.

FIG. 1 is a block diagram illustrating an example system 100, in accordance with at least one embodiment. The system 100 may include one or more processing environments. For example, portions of the system 100 may be allocated and/or assigned (e.g., dynamically) to different users (or tenants) and/or workloads. The system 100 includes one or more computing devices or systems (e.g., one or more servers 102). In FIG. 1, the server(s) 102 are illustrated as including servers 102A-102F. However, the server(s) 102 may include any number of servers, including a single server. By way of a non-limiting example, the server(s) 102 may implement (e.g., be a component of) another system, such as a data center 104, a cloud computing system, a machine learning system (e.g., utilizing one or more neural networks), an autonomous machine (e.g., an autonomous vehicle), medical imaging equipment, and/or the like. In at least one embodiment, at least a portion of the one or more of the server(s) 102 is/are implemented using at least a portion of any system(s) depicted in and/or described with respect to FIG. 6A-FIG. 9. In at least one embodiment, at least a portion of the data center 104 is/are implemented using at least a portion of any system(s) depicted in and/or described with respect to FIG. 6A-FIG. 9.

When the server(s) 102 include(s) multiple servers (e.g., the servers 102A-102F), the server(s) 102 may be connected together to form an internal network 106. The internal network 106 may include one or more network devices 108, such as switches, routers, and/or others, that route data traffic within the internal network 106, for example, to and from one or more of the server(s) 102. For example, the network device(s) 108 may route the data traffic between two or more of the server(s) 102.

One or more devices, such as one or more of the server(s) 102 and/or one or more of the network device(s) 108, may each include stream steering hardware (e.g., stream steering hardware 308 illustrated in FIGS. 3 and 4) to help prevent data streams sent to the device from potentially overwhelming a network interface of the device and/or one or more components of the network interface. The stream steering hardware may include an initial flow rate monitor (e.g., initial flow rate monitor 400 illustrated in FIG. 4), one or more meters (e.g., meter(s) 402 illustrated in FIG. 4), at least one rate limiter (e.g., rate limiter 408 illustrated in FIG. 4), and/or other hardware components. The stream steering hardware may be configured by one or more applications, such as an activation application 334 (see FIG. 3). The initial flow rate monitor and meter(s) may detect when one of the device(s) (e.g., one of the server(s) 102 and/or one of the network device(s) 108) is receiving too many packets (e.g., more than a threshold value) and the rate limiter(s) may stop the packets from overwhelmingly the network device by restricting their flow (e.g., toward a general services interface, QP1, a subnet manager, and/or the like). In at least one embodiment, at least a portion of one or more of the device(s) (e.g., one or more of the server(s) 102 and/or one or more of the network device(s) 108) is/are implemented using at least a portion of any system(s) depicted in and/or described with respect to FIG. 6A-FIG. 9.

Referring to FIG. 1, the server(s) 102 may be connected (e.g., via the internal network 106) to an external network 110 (e.g., the Internet) that connects one or more tenant computing devices 112 (e.g., operated by tenants 128 and 130) with the server(s) 102. The server(s) 102 and/or the internal network 106 may be connected to the external network 110 by one or more network gateway devices 114 that route(s) traffic between the external network 110 and the server(s) 102 (e.g., via the internal network 106). The network gateway device(s) 114 may be characterized as providing an interface between the external network 110 (e.g., the Internet) and the server(s) 102 (e.g., via the internal network 106). In at least one embodiment, at least a portion of one or more of the tenant computing devices 112 is/are implemented using at least a portion of any system(s) depicted in and/or described with respect to FIG. 6A-FIG. 9. In at least one embodiment, at least a portion of the external network 110 is implemented using at least a portion of any system(s) and/or network(s) depicted in and/or described with respect to FIG. 6A-FIG. 9. In at least one embodiment, at least one or more of the network gateway device(s) 114 is/are implemented using at least a portion of any system(s) and/or gateways(s) depicted in and/or described with respect to FIG. 6A-FIG. 9.

Referring to FIG. 1, the system 100 may implement one or more hypervisors 120. Each of the hypervisor(s) 120 is a virtual machine manager, which may assign hardware resources to one or more Virtual Machines ("VM(s)"). In the embodiment illustrated, each of the server(s) 102 implements a different one of the hypervisor(s) 120. Thus, FIG. 1 illustrates hypervisors 120A-120F implemented by the servers 102A-102F, respectively. By way of non-limiting examples, the hypervisor(s) 120 may be implemented using VMware ESX software, VMware ESXi software, Hyper-V software, Kernel-based Virtual Machine ("KVM") software, and/or the like. In at least one embodiment, at least one or more of the hypervisor(s) 120 is/are implemented using at least a portion of any system(s) depicted in and/or described with respect to FIG. 6A-FIG. 9.

Referring to FIG. 1, the server(s) 102 include network interface(s) 122. In the embodiment illustrated, each of the server(s) 102 implements a different one of the network interface(s) 122. Thus, FIG. 1 illustrates network interfaces 122A-122F implemented by the servers 102A-102F, respectively. One or more of the network interface(s) 122 may be implemented as a network interface controller ("NIC"), a network interface card, a network adapter, a Local Area Network ("LAN") adapter, a physical network interface, a host channel adapter ("HCA"), an Ethernet NIC, one or more circuits, and/or the like. By way of a non-limiting example, a single network interface card may include one or more of the network interface(s) 122. In at least one embodiment, at least one or more of the network interface(s) 122 is/are implemented using at least a portion of any system(s) and/or network interface(s) depicted in and/or described with respect to FIG. 6A-FIG. 9.

FIG. 2 is a block diagram illustrating an example processing system 200, in accordance with at least one embodiment. In at least one embodiment, the processing system 200 that may be used to implement a data center (e.g., the data center 104) or other computing environment in which multiple users (e.g., tenants 128 and 130) operate computing devices (e.g., tenant computing device(s) 112) that communicate with the processing system 200 over the internal and/or external networks 106 and 110. One or more of the server(s) 102 may be implemented using the processing system 200.

In at least one embodiment, the processing system 200 includes one or more processors 202 and one or more graphics processing units ("GPUs") 204, and may be a single processor desktop system, a multiprocessor workstation system, or a server system having a large number of processor(s) 202 and/or processor cores 206. For example, the processing system 200 may implement one or more computing devices, a data center, a cloud computing system, and/or the like. In at least one embodiment, the processors core 206 is referred to as a computing unit or compute unit.

In at least one embodiment, the processor(s) 202 each include one or more processor cores 206 to process instructions which, when executed, perform operations for system and user software. In at least one embodiment, each of the one or more processor cores 206 is configured to process a specific instruction set 208. In at least one embodiment, the instruction set 208 may facilitate Complex Instruction Set Computing ("CISC"), Reduced Instruction Set Computing ("RISC"), or computing via a Very Long Instruction Word ("VLIW"). In at least one embodiment, the processor cores 206 may each process a different instruction set 208, which may include instructions to facilitate emulation of other instruction sets. In at least one embodiment, the processor core 206 may also include other processing devices, such as a digital signal processor ("DSP").

In at least one embodiment, each of the processor(s) 202 includes cache memory ("cache") 210. In at least one embodiment, each of the processor(s) 202 can have a single internal cache or multiple levels of internal cache. In at least one embodiment, cache memory is shared among various components of each of the processor(s) 202. In at least one embodiment, a register file 212 is additionally included in each of the processor(s) 202 which may include different types of registers for storing different types of data (e.g., integer registers, floating point registers, status registers, and an instruction pointer register). In at least one embodiment, the register file 212 may include general-purpose registers or other registers.

In at least one embodiment, the processor(s) 202 are coupled with one or more interface bus(es) 214 to transmit communication signals such as address, data, or control signals between the processor(s) 202 and other components in processing system 200. In at least one embodiment, the interface bus(es) 214 can be a processor bus, such as a version of a Direct Media Interface ("DMI") bus. In at least one embodiment, the interface bus(es) 214 is/are not limited to a DMI bus, and may include one or more Peripheral Component Interconnect ("PCI") buses (e.g., PCI Express ("PCIe") bus(es)), one or more memory buses, or other types of interface buses. In at least one embodiment, the processor(s) 202 include an integrated memory controller 216 and a platform controller hub ("PCH") 218. In at least one embodiment, the memory controller 216 facilitates communication between a memory device 220 and other components of the processing system 200, while the PCH 218 provides connections to Input/Output ("I/O") devices 222, such as a keyboard, mouse, data storage device, and display unit (not shown), and network interface 224 (e.g., one of network interface(s) 122, a network interface controller ("NIC"), and/or the like) via a local I/O bus. In at least one embodiment, one or more PCI buses include PCIe Gen 5, which provides an interface for processors.

In at least one embodiment, the network interface 224 acts as the interface and controller for communication with other computing devices and/or network devices. In FIG. 2, the network interface 224 is coupled to a network device 226 (e.g., one of the network device(s) 108, such as an Infini-Band switch, an InfiniBand router, and/or the like), which permits multiple users and/or devices to communicate with the network interface 224. In at least one embodiment, the network device 226 may be integrated into the network interface 224. In at least one embodiment, tenant computing device(s) 112 operated by the tenants 128 and 130 communicate with the processing system 200 via the network device 226 and the network interface 224. Although the example of FIG. 1 illustrates only two tenants, a typical implementation of a data center (e.g., the data center 104) by the processing system 200 will have a large number of tenants that use a large number of computing devices to access services provided by the processing system 200. For example, the tenants 128 and 130 may cause the processing system 200 to create one or more virtual machines to perform one or more tasks, at least some which may generate management data to be sent to one or more of the network device(s) 108 and/or to one or more other devices (e.g., one or more of the server(s) 102) via one or more of the network device(s) 108.

In at least one embodiment, the network interface 224 may be implemented using any hardware, software, and/or firmware (e.g., described herein) that is suitable for implementing the network interface(s) 122. In at least one embodiment, at least a portion of the network interface 224 is implemented using at least a portion of any system(s) depicted in and/or described with respect to FIG. 6A-FIG. 9. The network interface 224 may send management data to the network device(s) 108 and/or receive management data from the network device(s) 108.

The network device 226 may send management data to other devices connected to the internal network 106 (e.g., one or more of the server(s) 102, one or more of the network device(s) 108, the network gateway device(s) 114, and/or the like) and/or receive management data from other devices connected to the internal network 106 (e.g., one or more of the server(s) 102, one or more of the network device(s) 108, the network gateway device(s) 114, and/or the like).

In at least one embodiment, the memory device 220 can be a dynamic random access memory ("DRAM") device, a static random access memory ("SRAM") device, flash memory device, phase-change memory device, or some other memory device having suitable performance to serve as processor memory. In at least one embodiment, the memory device 220 can operate as system memory for the processing system 200 that stores queue data 232 to enable communication with one or more of the server(s) 102, one or more of the network device(s) 108, one or more of the tenant computing device(s) 112 operated by the tenants 128-130, and/or the like. In at least one embodiment, the memory controller 216 couples with the GPU(s) 204 of processor(s) 202 to perform graphics and media operations.

Figure 3:
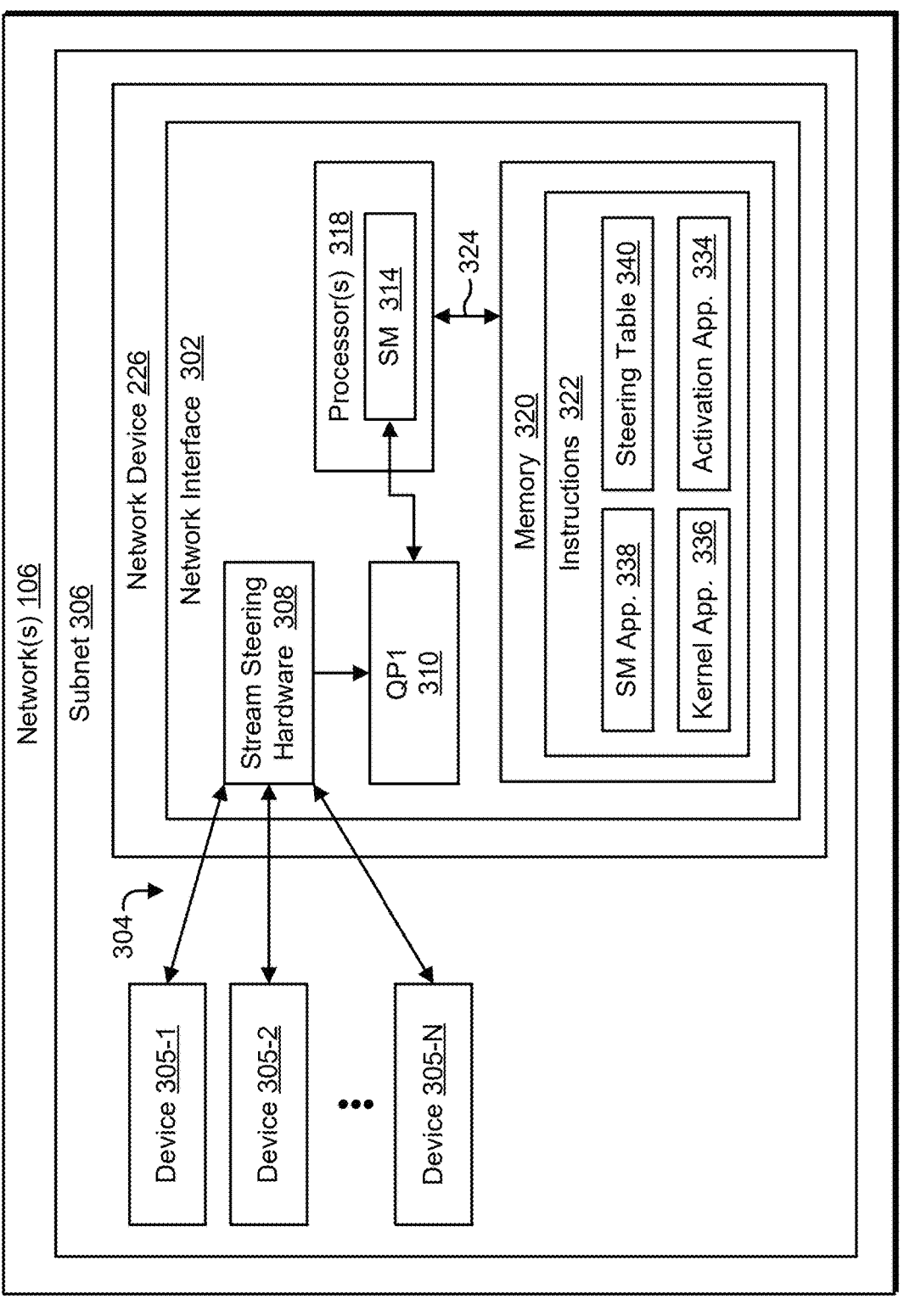
FIG. 3 illustrates a block diagram of a network interface of a network device receiving multiple data streams from other devices, in accordance with at least one embodiment.

FIG. 3 is block diagram illustrating a network interface 302 of the network device 226 receiving multiple data streams 304 from other devices 305-1 to 305-N (e.g., computing systems, one or more of server(s) 102, one or more of network device(s) 108, one or more of network gateway device(s) 114, routers, switches, and/or the like) connected to the internal network 106, in accordance with at least one embodiment. The network device 226 may be characterized as being a management node that receives management and/or administrative data (e.g., as packets) in the data streams 304. In at least one embodiment, the devices 305-1 to 305-N may include the processing system 200. One or more of devices 305-1 to 305-N may be implemented using any hardware, software, and/or firmware (e.g., described herein) that is suitable for implementing the processing system 200. In at least one embodiment, one or more of devices 305-1 to 305-N are implemented using at least a portion of any system(s) depicted in and/or described with respect to FIG. 6A-FIG. 9. The network interface 302 may be implemented using any hardware, software, and/or firmware (e.g., described herein) that is suitable for implementing the network interface 122 and/or the network interface 224. In at least one embodiment, at least a portion of the network interface 302 is implemented using at least a portion of any system(s) depicted in and/or described with respect to FIG. 6A-FIG. 9. In at least one embodiment, the network interface 302 and the stream steering hardware 308 may be implemented as part of the network device(s) 108 of FIG. 1. Alternatively, the network interface 302 and the stream steering hardware 308 may be implemented as part of the network interface(s) 122 of the server(s) 102 (e.g., the network interface 122A of the server 102A) shown in FIG. 1.

The network interface 302 receives the data streams 304 over the internal network 106 (e.g., RDMA and InfiniBand).

The network interface 302 implements a Subnet Manager ("SM") 314 that manages and/or configures a portion of the fabric of the internal network 106, referred to as a subnet 306. The subnet 306 is illustrated as including the devices 305-1 to 305-N. However, the subnet 306 may omit one or more of the devices 305-1 to 305-N and/or include one or more different devices. The SM 314 may assign a Local Identifier ("LID") to each communication device (e.g., the devices 305-1 to 305-N) connected to the subnet 306, which is managed by the SM 314. The network interface 302 may include a QP1 310 with respect to the subnet 306.

The QP1 310 may be used to send management information (e.g., in the data streams 304) to devices (e.g., the devices 305-1 to 305-N) within the subnet 306 and/or to receive management information from such devices within the subnet 306. The SM 314 communicates with other devices (such as switches, routers, and hosts) via the QP1 310 and may perform one or more tasks, such as management-related operations, including topology discovery (e.g., discovering switches, routers, and/or end nodes), LID allocation, routing updates, network configuration, and other administrative tasks. In at least one embodiment, in the subnet 306 (e.g., within one or more InfiniBand networks), management information (e.g., management packets) may be communicated in-band, which means the management information may be communicated within the same data network as other data packets (e.g., packets that transmit user data). For example, packets may be sent to the QP1 310 as unreliable datagrams, such as management datagrams (e.g., Subnet Management Packets). Management datagrams include information related to configuration changes, updates, adjustments, route updates, path optimization, congestion control, troubleshooting, error detection, performance analysis, authentication, authorization, and security enforcement and may be exchanged, for example, when the SM 314 assigns the LIDs to devices within the subnet 306. The SM 314 may actively monitor the health of the subnet 306 and/or the internal network 106 and/or may handle access control lists (ACLs) and/or security policies.

In a data center implemented, for example, by the processing system 200, multiple tenants (e.g., the tenants 128-130) may wish to communicate (e.g., management data) with the network interface 302 via the subnet 306. A device (e.g., one of server(s) 102) connected to the internal network 106 (e.g., to the subnet 306) includes send and receive queues, referred to collectively as a Queue Pair ("QP"). A particular device may include any number of QPs, including a single QP. A communication channel may be established between the QPs of two devices that allows the devices to communicate with one another. In at least one embodiment, the QP of the processing system 200 may be implemented at least in part using the queue data 232, which is part of or stored by the memory device 220. A communication channel may be established between at least one QP of the processing system 200 and the QP1 310. The QP(s) of the processing system 200 may communicate one or more of the data streams 304 to the QP1 310. The data streams 304 may communicate management or administrative data to the QP1 310.

The network interface 302 may include one or more processors 318 connected to memory 320 by one or more connections 324. In at least one embodiment, memory 320 (e.g., one or more non-transitory processor-readable medium) stores machine executable instructions 322 that when performed by processor(s) 318 implement an activation application 334, a kernel application 336, a subnet manager application 338, and/or a steering table 340.

In at least one embodiment, the processor(s) 318 include one or more circuits that perform at least a portion of instructions 322 stored in memory 320. In at least one embodiment, the processor(s) 318 include one or more parallel processing units ("PPU(s)"), such as one or more graphics processing units ("GPU(s)"), one or more massively parallel GPU(s), one or more accelerators, and/or others. In at least one embodiment, massively parallel GPU(s) refer to a collection of one or more GPUs, or any suitable processing units, which may be utilized to perform various processes in parallel. In at least one embodiment, the processor(s) 318 is/are implemented, for example, using a main central processing unit ("CPU") complex, one or more microprocessors, one or more microcontrollers, PPU(s) (e.g., accelerator(s), GPU(s), and/or others), one or more data processing units ("DPU(s)"), one or more arithmetic logic units ("ALU(s)"), and/or others. In at least one embodiment, one or more of the processor(s) 318 is/are implemented using one or more devices illustrated in and/or described with respect to FIG. 6A-FIG. 9. In at least one embodiment, any circuits used to implement one or more of the processor(s) 318 is/are implemented using any circuits illustrated in and/or described with respect to FIG. 6A-FIG. 9.

In at least one embodiment, the memory 320 (e.g., one or more non-transitory processor-readable medium) is implemented, for example, using volatile memory (e.g., dynamic random-access memory ("DRAM")) and/or nonvolatile memory (e.g., a hard drive, a solid-state device ("SSD"), and/or others). In at least one embodiment, the memory 320 (e.g., one or more non-transitory processor-readable medium) is implemented using one or more memory devices illustrated in and/or described with respect to FIG. 6A-FIG. 9.

In at least one embodiment, the memory 320 and the processor(s) 318 communicate with one another over the connection(s) 324, such as a bus, a Peripheral Component Interconnect Express ("PCIe") connection (or bus), and/or others. In at least one embodiment, the connection(s) 324 is/are implemented using one or more structures illustrated in and/or described with respect to FIG. 6A-FIG. 9.

In at least one embodiment, the data center 104 implemented, for example, using the processing system 200 of FIG. 2 may be used and/or accessed by multiple tenants that wish to use resources of the data center 104. Such resources and/or the tenant computing device(s) 112 operated by the tenants 128 and 130 may communicate with the network interface 302 to access software (e.g., services) provided by the SM 314. In at least one embodiment, the SM 314 may be incorporated into the network interface 224 and may control at least some operations thereof. In at least one embodiment, the SM 314 may be implemented as a set of instructions (e.g., instructions 322) included in the subnet manager application 338, which can be stored in a portion of the memory 320. While the SM 314 is provided as an example, in at least one embodiment, the principles of operation herein apply to any node running a service and are not limited to the example of a SM.

One tenant (e.g., the tenant 128) could attempt to instigate a DOS attack on the network interface 302 and prevent other tenants from utilizing software (e.g., a service) provided by the processor(s) 318 (e.g., the SM 314). In one scenario, a tenant may attempt to institute a malicious DoS that intentionally blocks out other tenants (e.g., by sending a large number of streams and/or a large amount of data in one or more streams to the network interface 302 and/or causing one or more of such streams to be sent). In another scenario, a non-malicious DOS attack can potentially occur if a single node (e.g., one of the device(s) 305-1 to 305-N) associated with one tenant (e.g., the tenant 128) exhibits bad software behavior that unintentionally blocks out other tenants. In either scenario, if the DOS attack is successful, the effect is that the network interface 302 becomes unresponsive to one or more of the tenants and/or devices connected to the internal network 106. For example, if the tenant 128 causes a large traffic flow to be sent to the network interface 302 (e.g., 18 mega packets per second (Mpps)), the traffic flow may exceed the data handling capacity of the network interface 302. If that occurs, the tenant 130 and/or other devices connected to the internal network 106 is effectively shut out from sending any data to the network interface 302.

Data packets communicated to the SM 314 arrive at QP1 310, but software-based deterrents are implemented by components (e.g., the SM 314, the processor(s) 318, and/or the like) downstream from the QP1 310. Thus, such software-based deterrents cannot prevent a DOS attack on QP1 310 because the DoS occurs before the data packets reach the software-based deterrents. That is, the network interface 302 is overwhelmed by the incoming data before it reaches a point where the software DoS prevention mechanism would intercede.

In at least one embodiment, the network interface 302 includes stream steering hardware 308 to help prevent the data streams 304 from potentially overwhelming the network interface 302 and/or the SM 314 of the network device 226. In at least one embodiment, the stream steering hardware 308 includes one or more physical hardware-based rate detector that monitors data (e.g., packets) received by the network interface 302 and prohibits one or more of data streams 304 from monopolizing capacity of the network interface 302. The network interface 302 and/or SM 314 may have a maximum processing rate at which the network interface 302 and/or SM 314 may process incoming packets. Thus, unless at least some of the packets are dropped by the QP1 310, packets may leave the QP1 310 at a rate that is at most equal to that maximum processing rate. If packets arrive at a rate that exceeds the maximum processing rate, the QP1 310 will become overwhelmed and unable to forward incoming packets. To prevent this from occurring, the stream steering hardware 308 (e.g., a hardware-based rate detector) is positioned in front of the QP1 310 to monitor packets delivered to the QP1 310.

Figure 4:
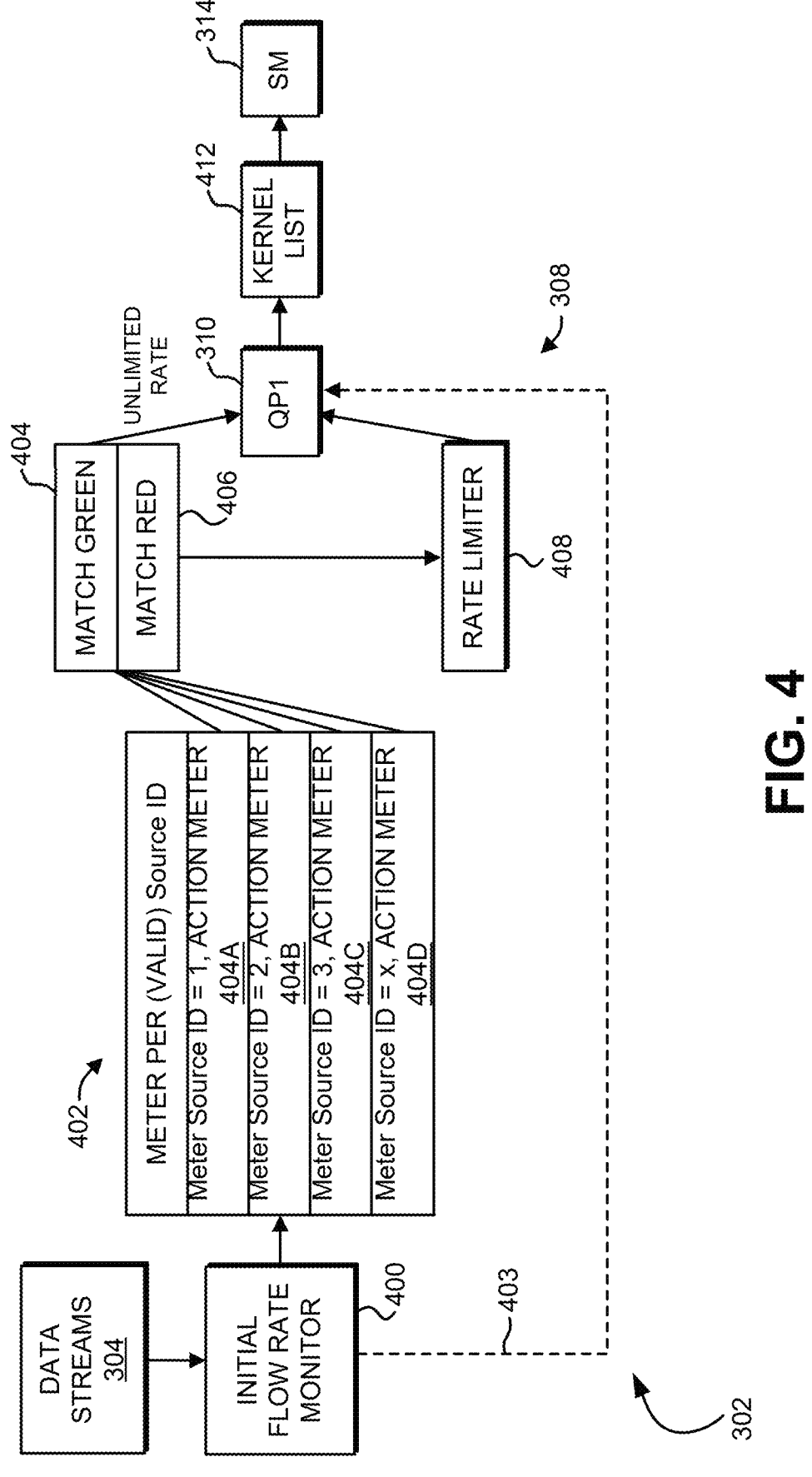
FIG. 4 illustrates a block diagram of an implementation of the network interface of FIG. 3 that includes stream steering hardware, in accordance with at least one embodiment.

FIG. 4 illustrates a block diagram of an implementation of the network interface 302 that includes the stream steering hardware 308 positioned in front of the QP1 310, in accordance with at least one embodiment. FIG. 4 illustrates the QP1 310 followed by a kernel list 412. In at least one embodiment, the kernel list 412 provides an interface between hardware (e.g., of the network interface 302) and software services provided by the SM 314. In at least one embodiment, the kernel list 412 may be a set of instructions (e.g., included in instructions 322) stored as the kernel application 336 in a portion of the memory 320.

In at least one embodiment, the network interface 302 includes an initial flow rate monitor 400 (e.g., implemented in hardware as a physical initial flow rate monitor). If the overall flow rate from the data streams 304 (e.g., generated in part by the tenants), as determined by the initial flow rate monitor 400, is below an input threshold value, there is no need for any downstream flow rate monitoring or rate limiting. This may be considered a first condition to be met by the initial flow rate monitor 400 to trigger operation of any rate limiting. For example, if the initial flow rate monitor 400 determines that the incoming flow from all sources (e.g., virtual machines initiated by the tenants 128-130 on one or more of server(s) 102 of FIG. 1) is less than the data handling capacity of the network interface 302 (e.g., 100 Kpps), it is not necessary to activate any rate limiting and the network interface 302 can process the data streams 304 without limitation. For example, the data streams 304 may be routed by the stream steering hardware 308 directly along a pathway (illustrated by dashed arrow 403) to the QP1 310. In at least one embodiment, the activation application 334 (e.g., software and/or firmware) may configure the initial flow rate monitor 400, for example, at start up. For example, the activation application 334 may store the input threshold value in one or more registers and/or one or more other storage devices accessible by the stream steering hardware 308 and the stream steering hardware 308 (e.g., the initial flow rate monitor 400) may use the input threshold value to determine whether or not to route the data streams 304 along the pathway illustrated by the dashed arrow 403 directly to the QP1 310.

In at least one embodiment, if the incoming flow from all sources (e.g., combined flow rate of the data streams 304) exceeds the input threshold value, the stream steering hardware 308 may activate one or more flow meters 402 to monitor the packet rate of each of one or more of the incoming data streams 304. FIG. 4 illustrates flow meters 402A-402D to monitor the flow rate of each of the incoming data streams 304. For example, a different flow meter may be activated for each source (e.g., one of device(s) 305-1 to 305-N) identified by a valid identifier (such as a local identifier (LID), a Source LID, and/or Source Group Identifier (SGID). In at least one embodiment, the flow meter(s) 402 is/are implemented in hardware. While in FIG. 4, the flow meter(s) 402 are illustrated as including the flow meters 402A-402D, the flow meter(s) 402 may include any number of flow meters, including a single flow meter. The pathway illustrated by the dashed arrow 403 bypasses the flow meter(s) 402.

In at least one embodiment, the network interface 302 may include the steering table 340 that includes steering rules that specify for which of the streams one of the meter(s) 402 is to be used to determine the flow rate. The activation application 334 (e.g., software and/or firmware) may use the steering table 340 to configure the stream steering hardware 308, for example, at start up. Each steering rule has a condition (e.g., criteria the stream must match) and a corresponding action (e.g., activate meter, or do not activate meter). This may be considered a third condition to be met by the particular data stream matching a predetermined Source ID and the action is that the corresponding meter is activated. After being configured by the activation application 334 (e.g., software and/or firmware), the stream steering hardware 308 may activate a meter with respect to a particular incoming packet stream if the stream satisfies the condition and the action indicates the meter is to be activated. For example, the conditions in the steering table 340 may identify one or more data streams using a source identifier ("Source ID") (e.g., source address, SLID, SGID, LID, and/or the like) and indicate whether a meter is to be activated with respect to each identifier. The activation application 334 may store these values in registers and/or other storage devices accessible by the stream steering hardware 308. In this manner, the processor(s) 318 performing the activation application 334 and/or the initial flow rate monitor 400 may determine whether to activate one or more of the meter(s) 402.

For each stream monitored by one of the meter(s) 402, the stream steering hardware 308 (e.g., the meter) applies a test to determine if the flow rate of packets in the stream exceeds a stream threshold level. The network interface 302 may be characterized as having two paths between a particular meter (e.g., the flow meter 402A) and the QP1 310, one with a rate limiter 408 and one without the rate limiter 408. In at least one embodiment, the activation application 334 may store the stream threshold level(s) in one or more registers and/or one or more other storage devices accessible by the stream steering hardware 308 and the stream steering hardware 308 (e.g., the meter(s) 402) may use the stream threshold level(s) to determine along which of the paths to route each of the stream(s). If the flow rate is below the stream threshold level, the stream steering hardware 308 allows packets 404 (e.g., referred to as "green" packets) to pass through to the QP1 310 in an unlimited fashion (e.g., along the path without the rate limiter 408). This may be considered a second condition to be met by each of the meters (e.g., the meters 402A-402D) to classify the packets in each stream as green packets that require no rate limiting or as red packets that require rate limiting 404.

On the other hand, if a particular flow rate is above the stream threshold level, the stream steering hardware 308 causes packets 406 (e.g., referred to as "red" packets) flow to the QP1 310 at a rate that is limited (e.g., along the path with the rate limiter 408). The rate limiter 408 may be implemented as a physical rate limiter implemented using hardware. In at least one embodiment, the rate limiter 408 limits the rate of the red packets 406 to a predetermined percentage of the overall flow rate for the SM 314. For example, if the optimal flow rate for the SM 314 is 100K packets per second ("Kpps"), the rate limiter 408 may only allow a small percentage of the red packets to reach the QP1 310 so that the overall rate for all flows does not exceed the optimal SM rate. In at least one embodiment, different stream threshold levels may be specified for different streams. The stream threshold levels may be stored by the steering table and accessed, for example, using the stream Source ID (e.g., source address, SLID, SGID, LID, and/or the like). In at least one embodiment, the activation application 334 (e.g., software and/or firmware) may use the steering table 340 to configure the rate limiter 408, for example, at start up. For example, the activation application 334 may store the stream threshold level(s) in one or more registers and/or one or more other storage devices accessible by the rate limiter 408 and the rate limiter 408 may use the stream threshold level(s) to limit the rate of the red packets 406 within one or more streams.

Figure 5:
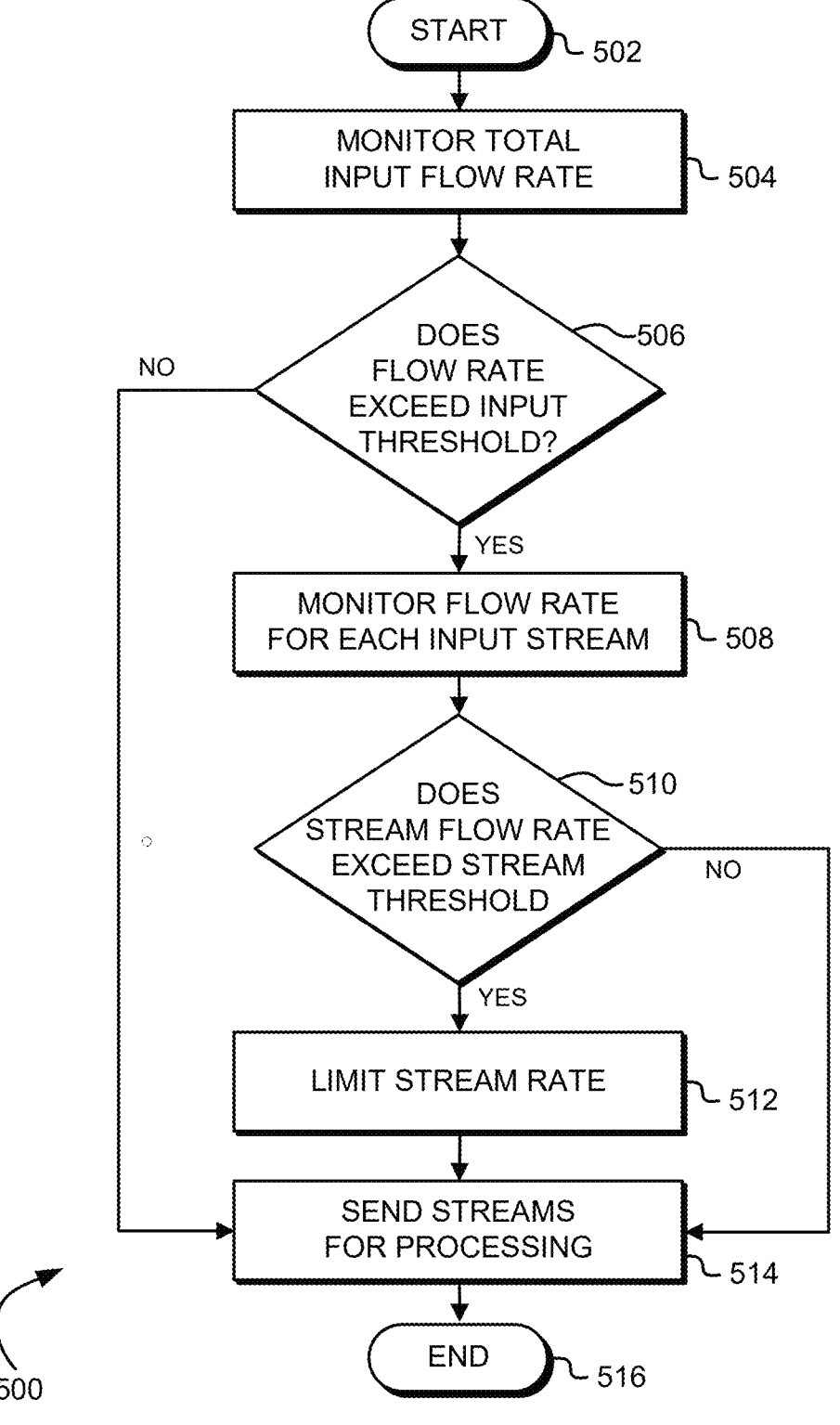
FIG. 5 is a flow diagram illustrating a method, in accordance with at least one embodiment.

FIG. 5 is a flow diagram illustrating a method 500, in accordance with at least one embodiment. In at least one embodiment, the method 500 is performed at least in part by a network interface (e.g., the network interface 302). At start 502, a network interface (e.g., the network interface 302 of the network device 226) is connected to and communicates with a plurality of sources (e.g., one or more devices operated by the tenants 128-130, one or more processes, one or more services, one or more devices, one or more applications, one or more Application Programming Interfaces, one or more drivers, and/or others), for example, over the internal network 106. At block 504, the network interface monitors a total input flow rate from all sources (e.g., virtual and/or physical) that are sending data to the network interface. In at least one embodiment, the initial flow rate monitor 400 may determine the total input flow rate for the source(s) that are sending data to the network interface. The network interface may measure the total input flow rate in packets per second.

In decision block 506, the network interface performing the method 500 determines whether the total input flow rate exceeds an input threshold value. In at least one embodiment, the input threshold value may be based on the data processing capacity of the network interface (e.g., the network interface 302), components of the network interface, such as the SM 314, and/or other components. If the total input flow rate does not exceed the input threshold value, there is no need for additional flow rate monitoring or rate limiting. In that event, the result of decision block 506 is NO, and the network interface advances to block 514 where the network interface allows the data streams to pass to the QP1 310 for processing. In the example of FIG. 4, the network interface passes the data streams to the QP1 310 and the data streams are processed by the SM 314. The SM 314 may access and/or use any data streams forwarded to and/or stored by the QP1 310.

If the total input flow rate exceeds the input threshold value, the result of decision block 506 is YES and the network interface may activate one or more meters (e.g., meter(s) 402). In at least one embodiment, the network interface may use the steering table 340 to configure the stream steering hardware 308, which determines whether a steering rule indicates a flow meter is to be activated for the stream (e.g., by looking up each of the streams in a steering table stored in the stream steering hardware 308 using the Source ID, such as a source address, the SLID and/or the SGID, of the stream). The stream steering hardware 308 may store the steering table in one or more registers and/or using one or more other storage devices.

In block 508, the network interface activates a flow meter (e.g., the flow meter 402A) for each of one or more of the input streams that monitors an individual flow rate for the input stream. For example, in block 508, the network interface may activate a flow meter for any streams associated with a steering rule that indicates a flow meter is to be activated. In at least one embodiment, the flow meter may include or be associated with a condition (e.g., criteria the stream must match) and a corresponding action (e.g., activate rate limiting, or do not activate rate limiting). The condition may be stored in the steering table 340, which may be used to configure the stream steering hardware 308, for example, at startup.

In decision block 510, the network interface (e.g., the flow meter) determine(s) whether each individual data stream exceeds a stream threshold value (e.g., does a particular flow satisfy a set condition). If the particular data stream does not exceed the stream threshold value (e.g., the condition is not met), the "match green" packets 404 require no rate limiting action. In this event, the result of decision block 510 is NO, and the network interface advances to block 514 where the particular data stream is passed on for processing. In the example of FIG. 4, the particular data stream is passed to the QP1 310 and processed by the SM 314.

If the flow meter (e.g., the flow meter 402A) and/or the activation application 334 determine(s) that a particular data stream exceeds the stream threshold (e.g., the particular flow meets the set condition), the "match red" packets 406 require rate limiting action. In this event, the result of decision block 510 is YES, and the network interface passes any stream that requires rate limiting to a rate limiter (e.g., the rate limiter 408).

In block 512, the rate limiter reduces the flow rate for any of the input streams that meet the set condition. In at least one embodiment, the rate of the red packets 406 is limited to a predetermined percentage of the overall flow rate. This may be dependent on data flows from other sources (e.g., tenants). In at least one embodiment, the rate limiter limits the rate of red packets 406 so that the offending data stream gets only a proportionate share of the overall data flow.

Following the rate limiting process of block 512, the network interface passes the rate-limited data packets to block 514 where the rate-limited data stream(s) are passed on for processing. In the example of FIG. 4, any stream(s) of rate-limited red packets and any stream(s) of green packets are passed to the QP1 310 and processed by the SM 314. In at least one embodiment, the method 500 may end 516 after block 514.

In at least one embodiment, the network interface provides a hardware-based solution to potential DOS attacks that is not subject to the limitations of software-based solutions. In this manner, it is possible to assure that the data streams associated with each tenant will get a fair share of the data processing capacity provided by the SM 314.

Figure 6A:
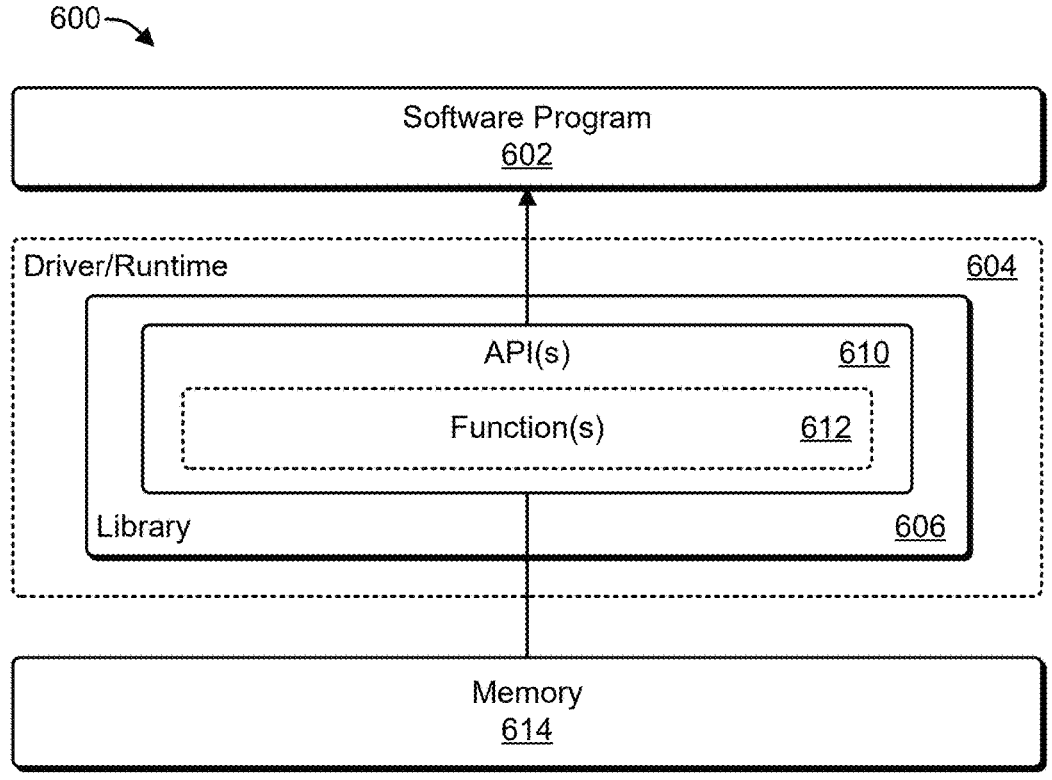
FIG. 6A illustrates an example of a system that includes a driver and/or runtime including one or more libraries to provide one or more application programming interfaces (APIs), in accordance with at least one embodiment.

FIG. 6A illustrates an example of a system 600 that includes one or more drivers and/or one or more runtimes (illustrated as reference numeral 604) including one or more libraries 606 to provide one or more application programming interfaces ("API(s)") 610, in accordance with at least one embodiment. In at least one embodiment, the system 600 includes the driver(s) 604 and/or the runtime(s) 604 including the library(ies) 606 to provide to the API(s) 610. In at least one embodiment, the API(s) 610 is/are sets of software instructions that, if executed, cause one or more processors (e.g., processor(s) 622 illustrated in FIG. 6B) to perform one or more computational operations. In at least one embodiment, one or more of the API(s) 610 is/are distributed or otherwise provided as a part of one or more of the library(ies) 606, one or more of the runtime(s) 604, one or more of the driver(s) 604, and/or one or more component of any other grouping of software and/or executable code further described herein. In at least one embodiment, one or more of the API(s) 610 perform one or more computational operations in response to invocation by one or more software programs 602.

In at least one embodiment, one or more of the software program(s) 602 is/are a software module and/or include(s) one or more software modules. In at least one embodiment, a software module is as further illustrated non-exclusively in FIG. 6B as one or more modules 624 and described with respect thereto. In at least one embodiment, one or more of the software program(s) 602 is/are a collection of software code, commands, instructions, and/or other sequences of text to instruct a computing device (e.g., the processor(s) 202) to perform one or more computational operations and/or invoke one or more other sets of instructions, such as the API(s) 610 or API function(s) 612, to be executed by the computing device. In at least one embodiment, functionality provided by one or more of the API(s) 610 includes the API function(s) 612, such as those usable to accelerate one or more portions of the software program(s) 602 using one or more parallel processing units (PPUs), such as graphics processing units (GPUs).

In at least one embodiment, one or more of the API(s) 610 is/are one or more hardware interfaces to one or more circuits to perform one or more computational operations. In at least one embodiment, one or more of the API(s) 610 described herein are implemented as one or more circuits to perform one or more techniques described in connection with FIGS. 1-5. In at least one embodiment, one or more of the software program(s) 602 include instructions that, if executed, cause one or more hardware devices and/or circuits to perform one or more techniques further described in connection with FIGS. 1-5. In at least one embodiment, the system 600 includes one or more or all components of the processing system 200 described in relation to FIG. 1, and the system 600 may perform one or more or all of the processes and/or operations that the systems and components of the processing system perform.

In at least one embodiment, the software program(s) 602, such as user-implemented software programs, utilize one or more of the API(s) 610 to perform various computing operations, such as memory reservation, matrix multiplication, arithmetic operations, and/or any computing operation performed by PPUs, such as GPUs, as further described herein. In at least one embodiment, the function(s) 612 include a set of callable functions provided by one or more of the API(s) 610 that are referred to herein as APIs, API functions, software functions, and/or functions, that individually perform one or more computing operations, such as computing operations related to parallel computing. In at least one embodiment, one or more of the API(s) 610 perform the process of defining conditions and actions performed by the flow meter (e.g., the flow meter 402, and/or perform other operations described herein (e.g., in connection with FIGS. 1-5).

Figure 6B:
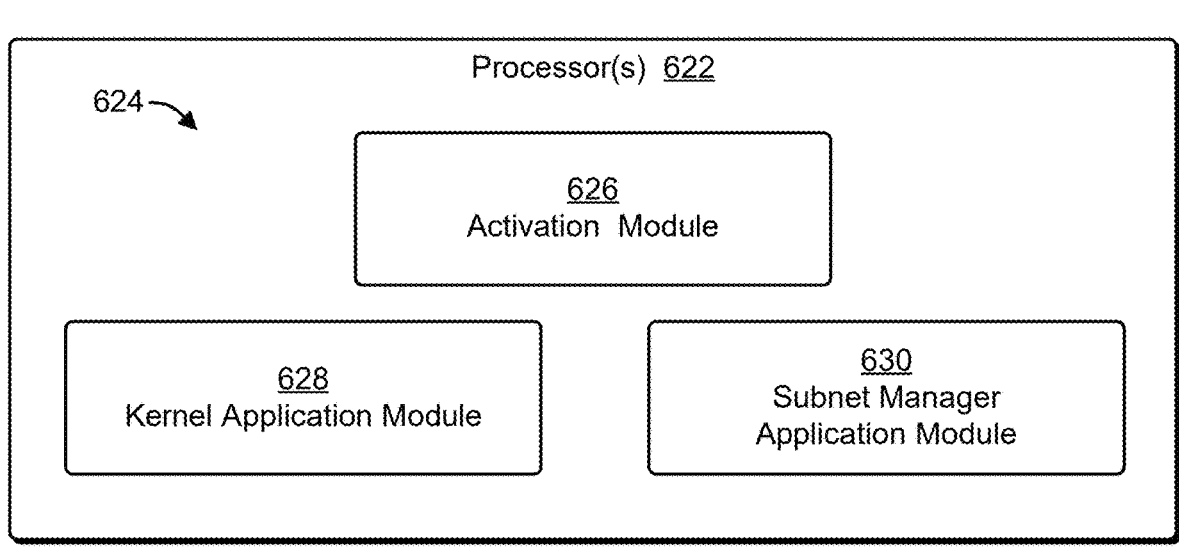
FIG. 6B is block diagram illustrating an example of a processor and modules, according to at least one embodiment.

In at least one embodiment, one or more of the software program(s) 602 interact or otherwise communicate with one or more of the API(s) 610 to perform one or more computing operations using one or more processors (e.g., processor(s) 622 illustrated in FIG. 6B), such as one or more PPUs, such as GPUs. In at least one embodiment, one or more computing operations using one or more PPUs include at least one or more groups of computing operations to be accelerated by execution at least in part by said one or more PPUs. In at least one embodiment, one or more of the API(s) 610 perform the process of defining conditions and actions performed by the flow meter (e.g., the flow meter 402, and/or perform other operations described herein (e.g., in connection with FIGS. 1-5).

In at least one embodiment, an interface is software instructions that, if executed, provide access to one or more of the function(s) 612 provided by one or more of the API(s) 610. In at least one embodiment, one or more of the software program(s) 602 use(s) a local interface when a software developer compiles one or more of the software program(s) 602 in conjunction with one or more of the library(ies) 606 including or otherwise providing access to one or more of the API(s) 610. In at least one embodiment, one or more of the software program(s) 602 is/are compiled statically in conjunction with one or more pre-compiled ones of the library(ies) 606 and/or uncompiled source code including instructions to perform one or more of the API(s) 610. In at least one embodiment, one or more of the software program(s) 602 are compiled dynamically and the dynamically compiled software program(s) utilize a linker to link to one or more pre-compiled ones of the library(ies) 606, including one or more of the API(s) 610.

In at least one embodiment, one or more of the software program(s) 602 use(s) a remote interface when a software developer executes a software program that utilizes or otherwise communicates with at least one of the library(ies) 606 including one or more of the API(s) 610 over a network or other remote communication medium. In at least one embodiment, one or more of the library(ies) 606 including one or more of the API(s) 610 are to be performed by a remote computing service, such as a computing resource services provider. In at least one embodiment, one or more of the library(ies) 606 including one or more particular APIs (of the API(s) 610) is/are to be performed by any other computing host providing the particular API(s) to one or more of the software program(s) 602.

In at least one embodiment, a processor (e.g., processor(s) 622 illustrated in FIG. 6B) performing or using one or more particular ones of the software program(s) 602 calls, uses, performs, and/or otherwise implements one or more of the API(s) 610 to allocate and otherwise manage memory 614 to be used by the particular software program(s). In at least one embodiment, one or more particular ones of the software program(s) 602 utilize one or more of the API(s) 610 to allocate and otherwise manage the memory 614 to be used by one or more portions of the particular software program(s) to be accelerated using one or more PPUs, such as GPUs, or any other accelerator or processor further described herein. In at least one embodiment, one or more of the software program(s) 602 request one or more neural networks to perform signal processing using one or more of the function(s) 612 provided by one or more of the API(s) 610. In at least one embodiment, the memory device 220 implements memory 614.

In at least one embodiment, one or more of the API(s) 610 is an API to facilitate parallel computing. In at least one embodiment, one or more of the API(s) 610 is any other API further described herein. In at least one embodiment, one or more of the API(s) 610 is/are provided by one or more of the driver(s) 604 and/or one or more of the runtime(s) 604. In at least one embodiment, one or more of the API(s) 610 is/are provided by a CUDA user-mode driver. In at least one embodiment, one or more of the API(s) 610 is/are provided by a CUDA runtime. In at least one embodiment, one or more of the driver(s) 604 is/are data values and software instructions that, if executed, perform and/or otherwise facilitate operation of one or more of the function(s) 612 of one or more of the API(s) 610 during load and execution of one or more portions of at least one of the software program(s) 602. In at least one embodiment, one or more of the runtime(s) 604 is/are data values and/or software instructions that, if executed, perform or otherwise facilitate operation of one or more of the function(s) 612 of one or more of the API(s) 610 during execution of at least one of the software program(s) 602. In at least one embodiment, one or more particular ones of the software program(s) 602 utilize one or more of the API(s) 610 implemented and/or otherwise provided by one or more of the driver(s) 604 and/or one or more of the runtime(s) 604 to perform combined arithmetic operations by the particular software program(s) during execution by one or more PPUs, such as GPUs.

In at least one embodiment, one or more of the software program(s) 602 utilize one or more of the API(s) 610 provided by one or more of the driver(s) 604 and/or one or more of the runtime(s) 604 to perform combined arithmetic operations of one or more PPUs, such as GPUs. In at least one embodiment, one or more of the API(s) 610 provide combined arithmetic operations through one or more of the driver(s) 604 and/or one or more of the runtime(s) 604, as described above. In at least one embodiment, one or more of the software program(s) 602 utilize one or more of the API(s) 610 provided by one or more of the driver(s) 604 and/or one or more of the runtime(s) 604 to allocate or otherwise reserve one or more blocks of the memory 614 of one or more PPUs, such as GPUs. In at least one embodiment, one or more of the software program(s) 602 utilize one or more of the API(s) 610 provided by one or more of the driver(s) 604 and/or one or more of the runtime(s) 604 to allocate or otherwise reserve blocks of the memory 614.

In at least one embodiment, to improve usability of one or more particular ones of the software program(s) 602 and/or improve performance, one or more portions of the particular software programs are to be accelerated by one or more PPUs (such as GPUs). In at least one embodiment, one or more of the function(s) 612 receive one or more input parameters indicating one or more inputs to one or more neural networks and/or other data to be utilized by the neural network(s), such as one or more hyperparameters of the neural network(s). In at least one embodiment, the input parameter(s) include the one or more inputs and/or the other data. In at least one embodiment, the input parameter(s) include one or more pointers to one or more memory locations where the input(s) and/or the other data is/are stored.

In at least one embodiment, the system 600 includes at least one processor (e.g., processor(s) 622 illustrated in FIG. 6B) including one or more circuits to perform one or more software programs to combine two or more of the API(s) 610 into a single API. In at least one embodiment, the system 600 includes at least one processor (e.g., processor(s) 622 illustrated in FIG. 6B) that uses one or more of the API(s) 610 to perform the process of defining conditions and actions performed by the flow meter (e.g., the flow meter 402, and/or perform other operations described herein (e.g., in connection with FIGS. 1-5), and/or otherwise perform operations described herein. In at least one embodiment, the system 600 includes at least one processor (e.g., processor(s) 622 illustrated in FIG. 6B) that uses one or more of the API(s) 610 to perform one or more operations illustrated in and/or described with respect to one or more of FIGS. 1-5, such as one or more processes illustrated in FIG. 3 or portion(s) thereof. In at least one embodiment, the system 600 includes at least one processor (e.g., processor(s) 622 illustrated in FIG. 6B) to perform one or more of the function(s) 612, such as those described in connection with FIGS. 1-5. In at least one embodiment, one or more of the API(s) 610 is to be performed by hardware described in connection with FIGS. 7A-9.

FIG. 6B is block diagram 620 illustrating example processor(s) 622 and the module(s) 624, according to at least one embodiment. Referring to FIG. 6B, in at least one embodiment, the processor(s) 622 may be implemented by the processor(s) 202. In at least one embodiment, the processor(s) 622 may perform one or more processes such as those described herein with respect to operational control of the NIC 124, and/or may otherwise perform operations described herein. In at least one embodiment, the processor(s) 622 perform(s) one or more processes such as those described in connection with FIGS. 1-5.

In at least one embodiment, the processor(s) 622 include one or more processors such as those described in connection with FIGS. 7A-9. In at least one embodiment, processor(s) 622 may be any suitable processing unit and/or combination of processing units, such as one or more CPUs, GPUs, DPUs, GPGPUs, PPUs, and/or variations thereof. The processor(s) 622 includes the module(s) 624, which may include an activation module 626 (e.g., the activation application 334) to perform the process of defining conditions and actions performed by the flow meter (e.g., the flow meter 402, a kernel application module 628 (e.g., the kernel application 336) to provide an interface between hardware and the processor(s) 202, and a subnet manager application module 630 (e.g., the subnet application manager 138) to service incoming requests from tenants (e.g., the tenants 128-130) and/or perform other operations described herein (e.g., in connection with FIGS. 1-5). The module(s) 624 may be distributed among multiple processors that communicate over a bus, network, by writing to shared memory, and/or any suitable communication process such as those described herein. In at least one embodiment, the module(s) 624 may include processor executable instructions that implement, by way of example, the activation application 334.

As used in any implementation described herein, unless otherwise clear from context or stated explicitly to contrary, a module refers to any combination of software logic, firmware logic, hardware logic, and/or circuitry configured to provide functionality described herein. Software may be embodied as a software package, code and/or instruction set or instructions, and "hardware," as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. Modules may, collectively or individually, be embodied as circuitry that forms part of a larger system, for example, an integrated circuit (IC), system on-chip (SoC), and so forth. a module performs one or more processes in connection with any suitable processing unit and/or combination of processing units, such as one or more CPUs, GPUs, GPGPUs, DPUs, PPUs, and/or variations thereof.

In at least one embodiment, as used in any implementation described herein, unless otherwise clear from context or stated explicitly to contrary, terms such as "module" and nominalized verbs (e.g., image manager, image analyzer, analytics engine, controller, and/or other terms) each refers to any combination of software logic, firmware logic, hardware logic, and/or circuitry configured to provide functionality described herein. In at least one embodiment, software may be embodied as a software package, code and/or instruction set or instructions, and "hardware," as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. In at least one embodiment, modules may, collectively or individually, be embodied as circuitry that forms part of a larger system, for example, an integrated circuit (IC), system on-chip (SoC), and so forth.

Logic

Figure 7A:
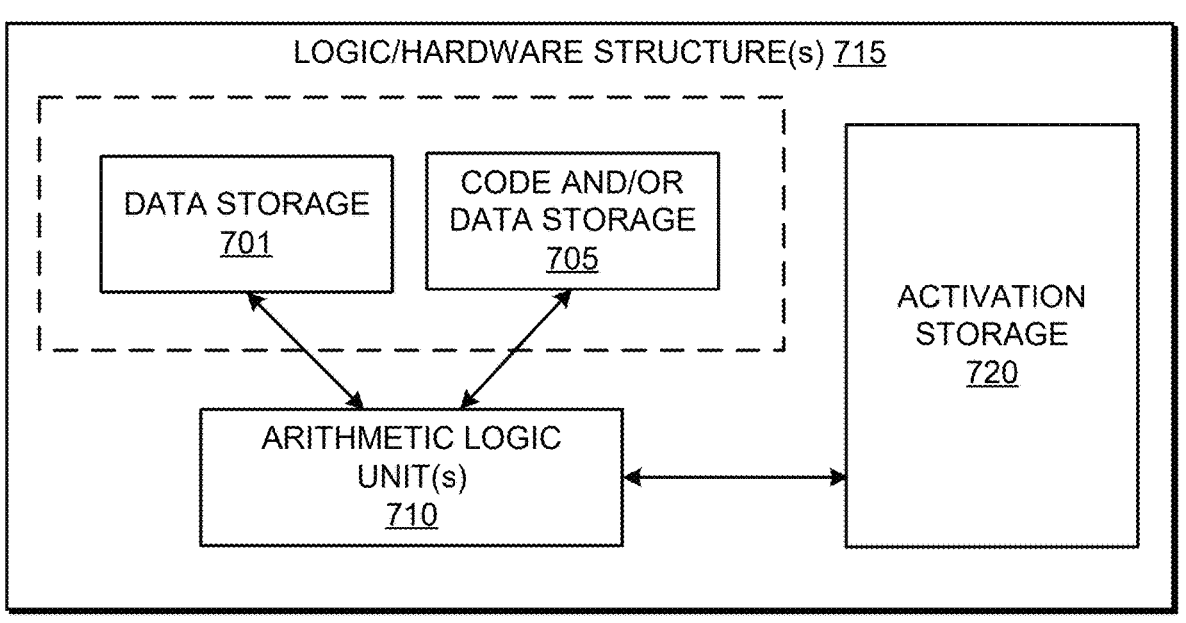
FIG. 7A illustrates logic, according to at least one embodiment.

FIG. 7A illustrates logic 715 which, as described elsewhere herein, can be used in one or more devices to perform operations such as those discussed herein in accordance with at least one embodiment. In at least one embodiment, logic 715 is used to perform inferencing and/or training operations associated with one or more embodiments. In at least one embodiment, logic 715 is inference and/or training logic. Details regarding logic 715 are provided below in conjunction with FIGS. 7A and/or 7B. In at least one embodiment, logic refers to any combination of software logic, hardware logic, and/or firmware logic to provide functionality or operations described herein, wherein logic may be, collectively or individually, embodied as circuitry that forms part of a larger system, for example, an integrated circuit (IC), system-on-chip (SoC), or one or processors (e.g., CPU, GPU).

In at least one embodiment, logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs)). In at least one embodiment, code, such as graph code, loads weight or other parameter information into processor ALUs based on an architecture of a neural network to which such code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 701 is internal or external to a processor, for example, or including DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs)).

In at least one embodiment, code, such as graph code, causes the loading of weight or other parameter information into processor ALUs based on an architecture of a neural network to which such code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to one or more processors or other hardware logic devices or circuits. In at least one embodiment, code and/or data storage 705 may be cache memory, DRAM, SRAM, non-volatile memory (e.g., flash memory), or other storage. In at least one embodiment, a choice of whether code and/or data storage 705 is internal or external to a processor, for example, or including DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be a combined storage structure. In at least one embodiment, code and/or data storage 701 and code and/or data storage 705 may be partially combined and partially separate. In at least one embodiment, any portion of code and/or data storage 701 and code and/or data storage 705 may be included with other on-chip or off-chip data storage, including a processor's L1, L2, or L3 cache or system memory.

In at least one embodiment, logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALUs 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., flash memory), or other storage. In at least one embodiment, activation storage 720 may be completely or partially within or external to one or more processors or other logical circuits. In at least one embodiment, a choice of whether activation storage 720 is internal or external to a processor, for example, or including DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, logic 715 illustrated in FIG. 7A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
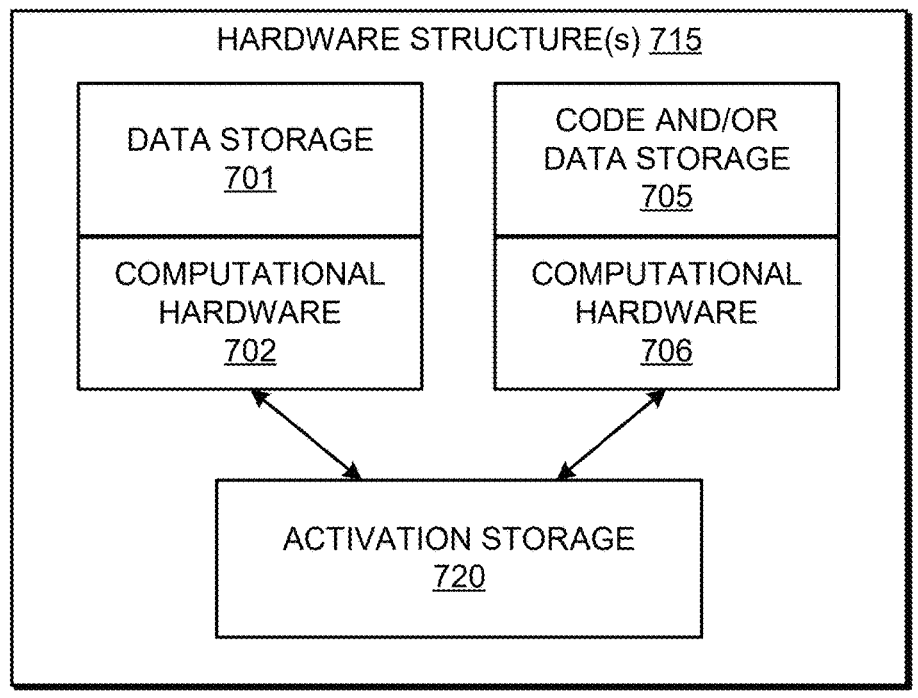
FIG. 7B illustrates logic, according to at least one embodiment.

FIG. 7B illustrates logic 715, according to at least one embodiment. In at least one embodiment, logic 715 is inference and/or training logic. In at least one embodiment, logic 715 may include, without limitation, hardware logic in which computational resources are dedicated or otherwise exclusively used in conjunction with weight values or other information corresponding to one or more layers of neurons within a neural network. In at least one embodiment, logic 715 illustrated in FIG. 7B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, logic 715 illustrated in FIG. 7B may be used in conjunction with central processing unit (CPU) hardware, graphics processing unit (GPU) hardware or other hardware, such as field programmable gate arrays (FPGAs). In at least one embodiment, logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 includes one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one storage/computational pair 701/702 of code and/or data storage 701 and computational hardware 702 is provided as an input to a next storage/computational pair 705/706 of code and/or data storage 705 and computational hardware 706, in order to mirror a conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage/computation pairs 701/702 and 705/706 may be included in logic 715.

The components of the system 100, such as the processor(s) 202 and the memory device 220 may be used to implement the logic and hardware structures 715 of FIGS. 7A-7B. In at least one embodiment, at least a portion of system(s) depicted in and/or described with respect to FIGS. 7A and/or 7B is used to implement one or more systems, techniques, functions, and/or processes described in connection with FIGS. 1-5. For example, in at least one embodiment, at least one component shown or described with respect to depicted in FIGS. 7A and/or 7B is used to control operation of the flow meter(s) 402 in accordance with one or more techniques, functions, and/or processes described with respect to any of FIGS. 1-5. In at least one embodiment, one or more systems depicted in or described with respect to FIGS. 7A and/or 7B are utilized to perform operations discussed herein such as those described herein with respect to the activation application 334, the kernel application 336, the subnet manager application 338, the method 500, the activation application module 626, the kernel application module 628, the subnet manager application module 630, and/or to perform other operations described herein.

Data Center

Figure 8:
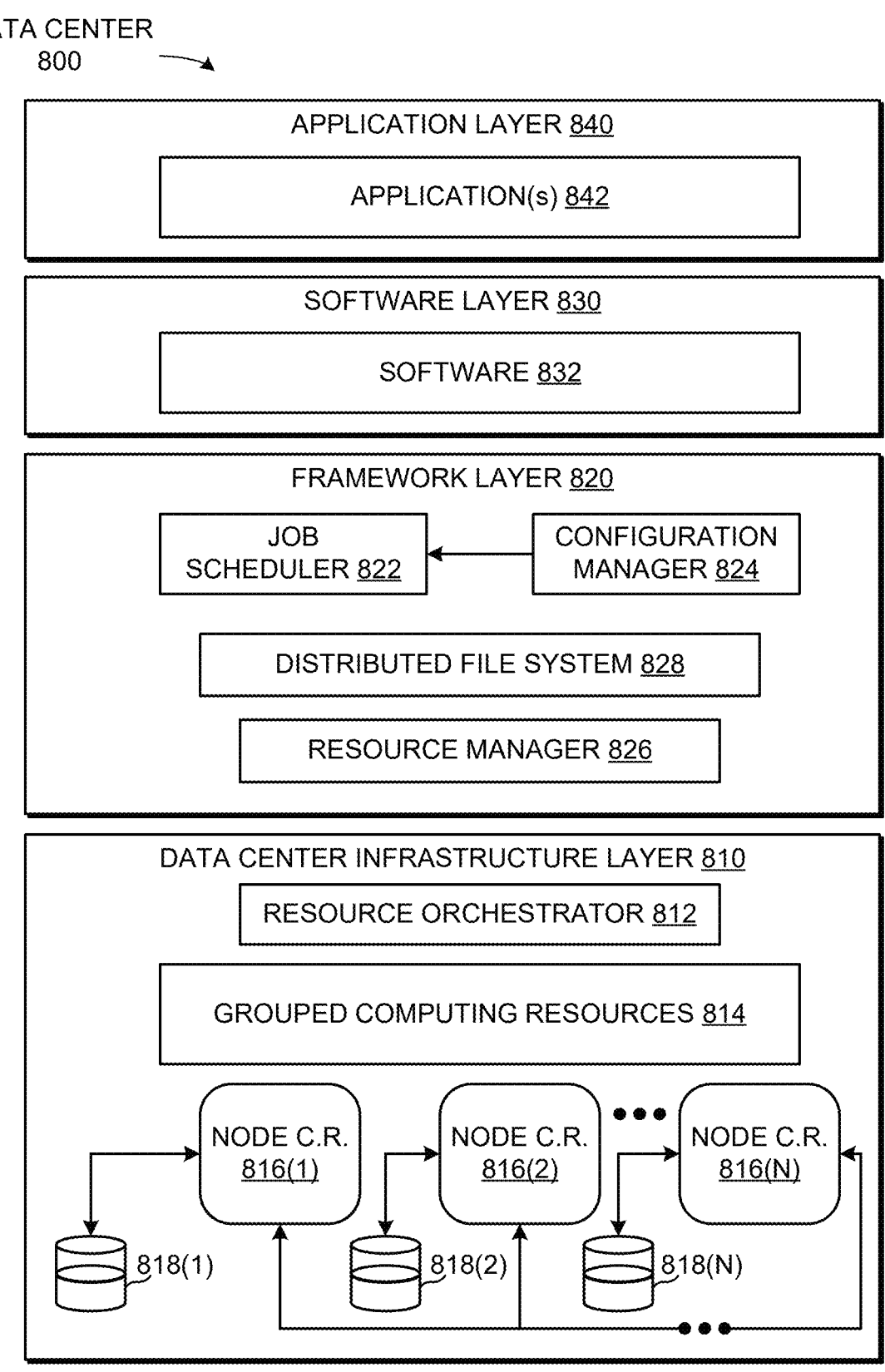
FIG. 8 illustrates an example data center system, according to at least one embodiment.

FIG. 8 illustrates an example data center 800, in which at least one embodiment may be used. In at least one embodiment, data center 800 includes a data center infrastructure layer 810, a framework layer 820, a software layer 830 and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents a positive integer (which may be a different integer "N" than used in other figures). In at least one embodiment, node C.R.s 816(1)-816(N) may include, but are not limited to, any number of central processing units ("CPUs") or other processors (including accelerators, field programmable gate arrays (FPGAs), graphics processors, etc.), memory storage devices 818(1)-818(N) (e.g., dynamic read-only memory, solid state storage or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). In at least one embodiment, separate groupings of node C.R.s within grouped computing resources 814 may include grouped compute, network, memory or storage resources that may be configured or allocated to support one or more workloads. In at least one embodiment, several node C.R.s including CPUs or processors may be grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator 812 may include hardware, software or some combination thereof.

In at least one embodiment, as shown in FIG. 8, framework layer 820 includes a job scheduler 822, a configuration manager 824, a resource manager 826 and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may utilize distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resources 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. In at least one embodiment, one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. In at least one embodiment, one or more types of applications may include, but are not limited to, any number of a genomics application, a cognitive compute, application and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underutilized and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Logic 715 are used to perform inferencing and/or training operations associated with one or more embodiments. Details regarding logic 715 are provided herein in conjunction with FIGS. 7A and/or 7B. In at least one embodiment, logic 715 may be used in data center 800 for inferencing or predicting operations based, at least in part, on weight parameters calculated using neural network training operations, neural network functions and/or architectures, or neural network use cases described herein.

In at least one embodiment, at least a portion of system(s) depicted in and/or described with respect to FIG. 8 is used to implement one or more systems, techniques, functions, and/or processes described in connection with FIGS. 1-5. For example, in at least one embodiment, at least one component shown or described with respect to depicted in FIG. 8 is used to control operation of the flow meter(s) 402 in accordance with one or more techniques, functions, and/or processes described with respect to any of FIGS. 1-5. In at least one embodiment, one or more systems depicted in or described with respect to FIG. 8 are utilized to perform operations discussed herein such as those described herein with respect to the activation application 334, the kernel application 336, the subnet manager application 338, the method 500, the activation application module 626, the kernel application module 628, the subnet manager application module 630, and/or to perform other operations described herein.

Computer Systems

Figure 9:
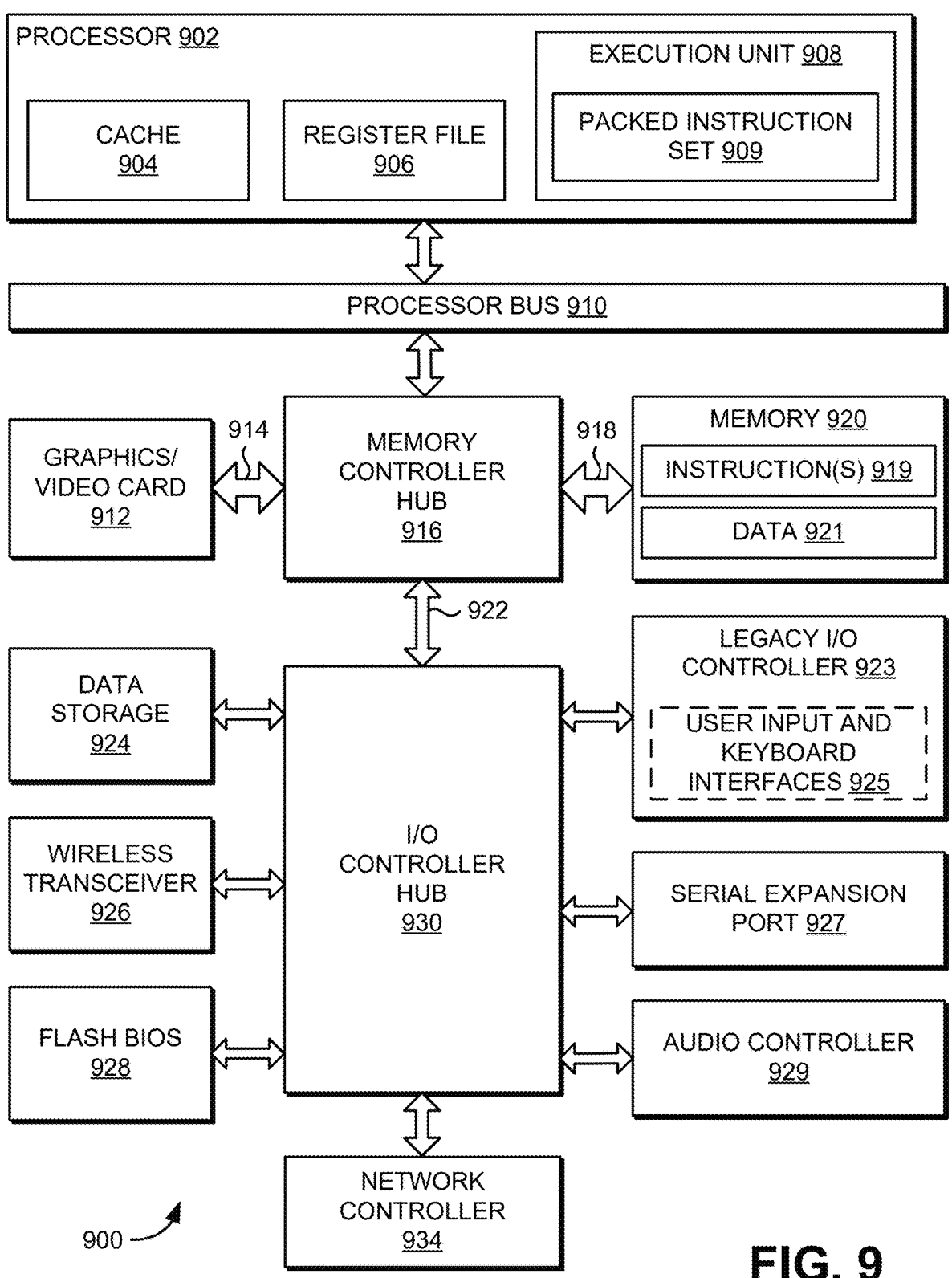
FIG. 9 is a block diagram illustrating a computer system, according to at least one embodiment.

FIG. 9 is a block diagram illustrating an exemplary computer system, which may be a system with interconnected devices and components, a system-on-a-chip (SOC) or some combination thereof formed with a processor that may include execution units to execute an instruction, according to at least one embodiment. In at least one embodiment, a computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution units 908 to perform machine learning model training and/or inferencing according to techniques described herein. In at least one embodiment, computer system 900 is a single processor desktop or server system, but in another embodiment, computer system 900 may be a multiprocessor system. In at least one embodiment, processor 902 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. Other embodiments may also include a combination of both internal and external caches depending on particular implementation and needs. In at least one embodiment, a register file 906 may store different types of data in various registers including, without limitation, integer registers, floating point registers, status registers, and an instruction pointer register.

In at least one embodiment, execution unit 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit 908 may include logic to handle a packed instruction set 909. In at least one embodiment, by including packed instruction set 909 in an instruction set of a general-purpose processor, along with associated circuitry to execute instructions, operations used by many multimedia applications may be performed using packed data in processor 902. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be a Dynamic Random Access Memory ("DRAM") device, a Static Random Access Memory ("SRAM") device, a flash memory device, or another memory device. In at least one embodiment, memory 920 may store instruction(s) 919 and/or data 921 represented by data signals that may be executed by processor 902.

In at least one embodiment, a system logic chip may be coupled to processor bus 910 and memory 920. In at least one embodiment, a system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O interface 922. In at least one embodiment, a system logic chip may provide a graphics port for coupling to a graphics controller. In at least one embodiment, MCH 916 may be coupled to memory 920 through high bandwidth memory path 918 and a graphics/video card 912 may be coupled to MCH 916 through an Accelerated Graphics Port ("AGP") interconnect 914.

In at least one embodiment, computer system 900 may use system I/O interface 922 as a proprietary hub interface bus to couple MCH 916 to an I/O controller hub ("ICH") 930. In at least one embodiment, ICH 930 may provide direct connections to some I/O devices via a local I/O bus. In at least one embodiment, a local I/O bus may include, without limitation, a high-speed I/O bus for connecting peripherals to memory 920, a chipset, and processor 902. Examples may include, without limitation, an audio controller 929, a firmware hub ("flash BIOS") 928, a wireless transceiver 926, a data storage 924, a legacy I/O controller 923 containing user input and keyboard interfaces 925, a serial expansion port 927, such as a Universal Serial Bus ("USB") port, and a network controller 934. In at least one embodiment, data storage 924 may include a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary SoC. In at least one embodiment, devices illustrated in FIG. 9 may be interconnected with proprietary interconnects, standardized interconnects (e.g., PCIe) or some combination thereof. In at least one embodiment, one or more components of computer system 900 are interconnected using compute express link (CXL) interconnects.

Logic 715 are used to perform inferencing and/or training operations associated with one or more embodiments. Details regarding logic 715 are provided herein in conjunction with FIGS. 7A and/or 7B. In at least one embodiment, logic 715 may be used in computer system 900 for inferencing or predicting operations based, at least in part, on weight parameters calculated using neural network training operations, neural network functions and/or architectures, or neural network use cases described herein.

In at least one embodiment, at least a portion of system(s) depicted in and/or described with respect to FIG. 9 is used to implement one or more systems, techniques, functions, and/or processes described in connection with FIGS. 1-5. For example, components of the computer system 900 may be implemented by the processing system 200 of FIG. 2. In at least one embodiment, at least one component shown or described with respect to depicted in FIG. 9 is used to control operation of the flow meter(s) 402 in accordance with one or more techniques, functions, and/or processes described with respect to any of FIGS. 1-5. In at least one embodiment, one or more systems depicted in or described with respect to FIG. 9 are utilized to perform operations discussed herein such as those described herein with respect to the activation application 334, the kernel application 336, the subnet manager application 338, the method 500, the activation application module 626, the kernel application module 628, the subnet manager application module 630, and/or to perform other operations described herein.

At least one embodiment of the disclosure can be described in view of the following clauses:

1. A system comprising an initial data rate monitor to measure a total data rate of a plurality of data flows into a network interface; one or more physical meters to determine one or more rates at which one or more of the plurality of data flows flow into the network interface if the total data rate satisfies at least one first condition; and at least one physical rate limiter to limit at least one rate of the one or more rates if the total data rate satisfies the at least one first condition and the at least one rate satisfies at least one second condition to thereby provide access to at least one resource of the network interface to the plurality of data flows.

2. The system of clause 1, wherein at least one of the one or more physical meters is to activate if at least one of the plurality of data flows satisfies at least one third condition.

3. The system of any of clauses 1 and 2, further comprising a pathway to bypass the one or more physical meters and the at least one physical rate limiter if the total data rate does not satisfy the at least one first condition.

4. The system of clause 3, wherein the at least one first condition comprises a total flow threshold, and the network interface is to have a maximum data processing rate and the total flow threshold is equal to or less than the maximum data processing rate.

5. The system of any of the clauses 1 to 4, wherein the network interface is to have a maximum data processing rate and the at least one physical rate limiter is to limit the at least one rate to a predetermined percentage of the maximum data processing rate.

6. The system of any of the clauses 1 to 5, wherein the one or more physical meters are positioned before a queue pair (QP) of the network interface.

7. The system of any of the clauses 1 to 6, further comprising one or more processors to perform a subnet manager, wherein packets of at least a portion of the plurality of data flows are to be stored in a receive queue of the QP, and the subnet manager is to perform at least one task based at least in part on the packets stored in the receive queue.

8. A method comprising using an initial data rate monitor to measure a total data rate of a plurality of data flows into a network interface; using one or more physical meters to determine one or more rates at which one or more of the plurality of data flows flow into the network interface if the total data rate satisfies at least one first condition; and using at least one physical rate limiter to limit at least one rate of the one or more rates if the total data rate satisfies the at least one first condition and the at least one rate satisfies at least one second condition to thereby provide access to at least one resource of the network interface to the plurality of data flows.

9. The method of clause 8, wherein whether to activate the one or more physical meters is determined at least in part on whether at least one of a plurality of data flows satisfies at least one third condition.

10. The method of any of the clauses 8 and 9, further comprising using a pathway to bypass the one or more physical meters and the at least one physical rate limiter if the total data rate does not satisfy the at least one first condition.

11. The method of any of the clauses 8 to 10, wherein the at least one first condition comprises a total flow threshold, and the network interface is to have a maximum data processing rate and the total flow threshold is equal to or less than the maximum data processing rate.

12. The method of any of the clauses 8 to 11, wherein the network interface is to have a maximum data processing rate and the at least one physical rate limiter is to limit the at least one rate to a predetermined percentage of the maximum data processing rate.

13. The method of any of the clauses 8 to 12, wherein if the one or more physical meters are activated, at least one rate of the one or more rates is limited based at least in part on at least one threshold value, the network interface is to have a maximum data processing rate, and the at least one rate is limited to a predetermined percentage of the maximum data processing rate.

14. The method of any of the clauses 8 to 13, wherein the network interface comprises a queue pair ("QP"), and the one or more physical meters are positioned such that any packets flowing to the QP must pass through the one or more physical meters if the one or more meters are activated.

15. A processor comprising one or more circuits to: operate an initial data rate monitor to measure a total data rate of a plurality of data flows into a network interface; to use one or more physical meters to determine one or more rates at which one or more of the plurality of data flows flow into the network interface if the total data rate satisfies at least one first condition; and to use at least one physical rate limiter to limit at least one rate of the one or more rates if the total data rate satisfies the at least one first condition and the at least one rate satisfies at least one second condition to thereby provide access to at least one resource of the network interface to the plurality of data flows.

16. The processor of clause 15, wherein the one or more circuits are to cause at least one of the one or more physical meters to activate if at least one of the plurality of data flows satisfies at least one third condition.

17. The processor of any of clauses 15 and 16, wherein the one or more circuits are to use the at least one physical rate limiter to reduce at least a rate of the one or more rates based at least part on the at least one second condition; determine whether a second of the one or more flow rates obtained from a second physical meter monitoring the second data stream fails to satisfy the at least one second condition; and leave the second of the one or more rates unchanged based at least part on the second condition.

18. The processor of any of the clauses 15 to 17, wherein the one or more circuits are to provide a pathway to bypass the one or more physical meters and the at least one physical rate limiter if the total data rate does not satisfy the at least one first condition 19. The processor of any of the clauses 15 to 18, wherein the network interface is to have a maximum data processing rate and the at least one physical rate limiter is to limit the at least one rate to a predetermined percentage of the maximum data processing rate.

20. The processor of any of the clauses 15 to 19, wherein the at least one first condition comprises a total flow threshold, and the network interface is to have a maximum data processing rate, and the total flow threshold is equal to or less than the maximum data processing rate.

21 The processor of any of the clauses 15 to 20, wherein the network interface is to have a maximum data processing rate and at least one of the one or more rates is reduced to at most a predetermined percentage of the maximum data processing rate.

22. The processor of any of the clauses 15 to 21, wherein the network interface comprises a queue pair ("QP"), and the first physical meter is positioned such that the first data stream must pass through the first physical meter before reaching the QP.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, computer programs in form of machine-readable executable code or computer control logic algorithms are stored in main memory and/or secondary storage such as those described herein. Computer programs, if executed by one or more processors, enable at least one system described herein to perform various functions in accordance with at least one embodiment. In at least one embodiment, memory, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of a CPU such as those described herein, a parallel processing system such as those described herein, an integrated circuit capable of at least a portion of capabilities of both the CPU, the parallel processing system, a chipset (e.g., a group of integrated circuits designed to work and sold as a unit for performing related functions, etc.), and/or any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, a computer system described herein may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic. In at least one embodiment, a computer system includes or refers to any devices illustrated in any of the drawings and/or described herein.

In at least one embodiment, a parallel processing system includes, without limitation, a plurality of parallel processing units ("PPUs") and associated memories. In at least one embodiment, PPUs are connected to a host processor or other peripheral devices via an interconnect and a switch or multiplexer. In at least one embodiment, a parallel processing system distributes computational tasks across the PPUs, which can be parallelizable—for example, as part of distribution of computational tasks across multiple graphics processing unit ("GPU") thread blocks. In at least one embodiment, memory is shared and accessible (e.g., for read and/or write access) across some or all of the PPUs, although such shared memory may incur performance penalties relative to use of local memory and registers resident to a PPU. In at least one embodiment, operation of the PPUs is synchronized through use of a command such as __syncthreads( ), wherein all threads in a block (e.g., executed across multiple PPUs) to reach a certain point of execution of code before proceeding.

In at least one embodiment, one or more techniques described herein utilize a oneAPI programming model. In at least one embodiment, a oneAPI programming model refers to a programming model for interacting with various compute accelerator architectures. In at least one embodiment, oneAPI refers to an application programming interface (API) designed to interact with various compute accelerator architectures. In at least one embodiment, a oneAPI programming model utilizes a DPC++ programming language. In at least one embodiment, a DPC++ programming language refers to a high-level language for data parallel programming productivity. In at least one embodiment, a DPC++ programming language is based at least in part on C and/or C++ programming languages. In at least one embodiment, a oneAPI programming model is a programming model such as those developed by Intel Corporation of Santa Clara, CA.

In at least one embodiment, oneAPI and/or oneAPI programming model is utilized to interact with various accelerator, GPU, processor, and/or variations thereof, architectures. In at least one embodiment, oneAPI includes a set of libraries that implement various functionalities. In at least one embodiment, oneAPI includes at least a oneAPI DPC++ library, a oneAPI math kernel library, a oneAPI data analytics library, a oneAPI deep neural network library, a oneAPI collective communications library, a oneAPI threading building blocks library, a oneAPI video processing library, and/or variations thereof.

In at least one embodiment, a oneAPI DPC++ library, also referred to as oneDPL, is a library that implements algorithms and functions to accelerate DPC++ kernel programming. In at least one embodiment, oneDPL implements one or more standard template library (STL) functions. In at least one embodiment, oneDPL implements one or more parallel STL functions. In at least one embodiment, oneDPL provides a set of library classes and functions such as parallel algorithms, iterators, function object classes, range-based API, and/or variations thereof. In at least one embodiment, oneDPL implements one or more classes and/or functions of a C++ standard library. In at least one embodiment, oneDPL implements one or more random number generator functions.

In at least one embodiment, a oneAPI math kernel library, also referred to as oneMKL, is a library that implements various optimized and parallelized routines for various mathematical functions and/or operations. In at least one embodiment, oneMKL implements one or more basic linear algebra subprograms (BLAS) and/or linear algebra package (LAPACK) dense linear algebra routines. In at least one embodiment, oneMKL implements one or more sparse BLAS linear algebra routines. In at least one embodiment, oneMKL implements one or more random number generators (RNGs). In at least one embodiment, oneMKL implements one or more vector mathematics (VM) routines for mathematical operations on vectors. In at least one embodiment, oneMKL implements one or more Fast Fourier Transform (FFT) functions.

In at least one embodiment, a oneAPI data analytics library, also referred to as oneDAL, is a library that implements various data analysis applications and distributed computations. In at least one embodiment, oneDAL implements various algorithms for preprocessing, transformation, analysis, modeling, validation, and decision making for data analytics, in batch, online, and distributed processing modes of computation. In at least one embodiment, oneDAL implements various C++ and/or Java APIs and various connectors to one or more data sources. In at least one embodiment, oneDAL implements DPC++ API extensions to a traditional C++ interface and enables GPU usage for various algorithms.

In at least one embodiment, a oneAPI deep neural network library, also referred to as oneDNN, is a library that implements various deep learning functions. In at least one embodiment, oneDNN implements various neural network, machine learning, and deep learning functions, algorithms, and/or variations thereof.

In at least one embodiment, a oneAPI collective communications library, also referred to as oneCCL, is a library that implements various applications for deep learning and machine learning workloads. In at least one embodiment, oneCCL is built upon lower-level communication middleware, such as message passing interface (MPI) and libfabrics. In at least one embodiment, oneCCL enables a set of deep learning specific optimizations, such as prioritization, persistent operations, out of order executions, and/or variations thereof. In at least one embodiment, oneCCL implements various CPU and GPU functions.

In at least one embodiment, a oneAPI threading building blocks library, also referred to as oneTBB, is a library that implements various parallelized processes for various applications. In at least one embodiment, oneTBB is utilized for task-based, shared parallel programming on a host. In at least one embodiment, oneTBB implements generic parallel algorithms. In at least one embodiment, oneTBB implements concurrent containers. In at least one embodiment, oneTBB implements a scalable memory allocator. In at least one embodiment, oneTBB implements a work-stealing task scheduler. In at least one embodiment, oneTBB implements low-level synchronization primitives. In at least one embodiment, oneTBB is compiler-independent and usable on various processors, such as GPUs, PPUs, CPUs, and/or variations thereof.

In at least one embodiment, a oneAPI video processing library, also referred to as oneVPL, is a library that is utilized for accelerating video processing in one or more applications. In at least one embodiment, oneVPL implements various video decoding, encoding, and processing functions. In at least one embodiment, one VPL implements various functions for media pipelines on CPUs, GPUs, and other accelerators. In at least one embodiment, one VPL implements device discovery and selection in media centric and video analytics workloads. In at least one embodiment, one VPL implements API primitives for zero-copy buffer sharing.

In at least one embodiment, a oneAPI programming model utilizes a DPC++ programming language. In at least one embodiment, a DPC++ programming language is a programming language that includes, without limitation, functionally similar versions of CUDA mechanisms to define device code and distinguish between device code and host code. In at least one embodiment, a DPC++ programming language may include a subset of functionality of a CUDA programming language. In at least one embodiment, one or more CUDA programming model operations are performed using a oneAPI programming model using a DPC++ programming language.

In at least one embodiment, any application programming interface (API) described herein is compiled into one or more instructions, operations, or any other signal by a compiler, interpreter, or other software tool. In at least one embodiment, compilation includes generating one or more machine-executable instructions, operations, or other signals from source code. In at least one embodiment, an API compiled into one or more instructions, operations, or other signals, when performed, causes one or more processors, such as graphics processors, graphics cores, parallel processor, a CPU, or any other logic circuit further described herein to perform one or more computing operations.

It should be noted that, while example embodiments described herein may relate to a CUDA programming model, techniques described herein can be utilized with any suitable programming model, such HIP, oneAPI, and/or variations thereof.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware, or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In the scope of this application, the term arithmetic logic unit, or ALU, is used to refer to any computational logic circuit that processes operands to produce a result. For example, in the present document, the term ALU can refer to a floating point unit, a DSP, a tensor core, a shader core, a coprocessor, or a CPU.

In at least one embodiment, one or more components of systems and/or processors disclosed above can communicate with one or more CPUs, ASICs, GPUs, FPGAs, or other hardware, circuitry, or integrated circuit components that include, e.g., an upscaler or upsampler to upscale an image, an image blender or image blender component to blend, mix, or add images together, a sampler to sample an image (e.g., as part of a DSP), a neural network circuit that is configured to perform an upscaler to upscale an image (e.g., from a low resolution image to a high resolution image), or other hardware to modify or generate an image, frame, or video to adjust its resolution, size, or pixels; one or more components of systems and/or processors disclosed above can use components described in this disclosure to perform methods, operations, or instructions that generate or modify an image.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising:
an initial data rate monitor to measure a total data rate of a plurality of data flows into a network interface;
one or more physical meters positioned between a queue pair (QP) of the network interface and at least one source of at least one of the plurality of data flows, the one or more physical meters to determine one or more rates at which one or more of the plurality of data flows flow into the network interface if the total data rate satisfies at least one first condition; and
at least one physical rate limiter positioned between the QP and the at least one source, the at least one physical rate limiter to limit at least one rate of the one or more rates at which at least one of the plurality of data flows is provided to a receive queue of the QP if the total data rate satisfies the at least one first condition and the at least one rate satisfies at least one second condition to thereby provide access to at least one resource of the network interface to the plurality of data flows.

2. The system of claim 1, wherein at least one of the one or more physical meters is to activate if at least one of the plurality of data flows satisfies at least one third condition.

3. The system of claim 1, further comprising:
a pathway to bypass the one or more physical meters and the at least one physical rate limiter if the total data rate does not satisfy the at least one first condition.

4. The system of claim 3, wherein the at least one first condition comprises a total flow threshold, and the network interface is to have a maximum data processing rate and the total flow threshold is equal to or less than the maximum data processing rate.

5. The system of claim 1, wherein the network interface is to have a maximum data processing rate and the at least one physical rate limiter is to limit the at least one rate to a predetermined percentage of the maximum data processing rate.

6. The system of claim 1, wherein the one QP comprises the receive queue and a send queue.

7. The system of claim 1, further comprising:
one or more processors to perform a subnet manager, wherein packets of at least a portion of the plurality of data flows are to be stored in the receive queue of the QP, and the subnet manager is to perform at least one task based at least in part on the packets stored in the receive queue.

8. A method comprising:

determining a total data rate of a plurality of data flows within a network interface satisfies at least one first condition;

after determining the total data rate satisfies the at least one first condition, using one or more physical meters positioned between a queue pair (QP) of the network interface and at least one source of at least a portion of the plurality of data flows to determine one or more rates of one or more of the plurality of data flows;

providing, as a set of input flows, to at least one physical rate limiter positioned between the QP and the at least one source, any of the plurality of data flows that have a rate that satisfies at least one second condition; and using the at least one physical rate limiter to limit at least one rate at which at least one of the set of input flows is provided to a receive queue of the QP.

9. The method of claim 8, further comprising:

activating the one or more physical meters before determining the one or more rates, and after determining that at least one of the plurality of data flows satisfies at least one third condition.

10. The method of claim 8, further comprising:

determining a new total data rate of a plurality of new data flows within the network interface does not satisfy the at least one first condition; and routing the plurality of new data flows along a pathway that bypasses the one or more physical meters and the at least one physical rate limiter.

11. The method of claim 10, wherein the at least one first condition comprises a total flow threshold, and the network interface is to have a maximum data processing rate and the total flow threshold is equal to or less than the maximum data processing rate.

12. The method of claim 8, wherein the network interface is to have a maximum data processing rate and the at least one physical rate limiter is to limit the at least one rate to a predetermined percentage of the maximum data processing rate.

13. The method of claim 8, wherein the at least one physical rate limiter limits the at least one rate based at least in part on at least one threshold value.

14. The method of claim 8, further comprising, using an initial data rate monitor positioned between the QP and the at least one source to measure the total data rate.

15. A processor comprising:

one or more circuits to:

operate an initial data rate monitor to measure a total data rate of a plurality of data flows into a network interface;

use one or more physical meters positioned between a queue pair (QP) of the network interface and at least one source of at least one of the plurality of data flows to determine one or more rates at which one or more of the plurality of data flows flow into the network interface if the total data rate satisfies at least one first condition; and use at least one physical rate limiter positioned between the QP and the at least one source to limit at least one rate of the one or more rates at which at least one of the plurality of data flows is provided to a receive queue of the QP if the total data rate satisfies the at least one first condition and the at least one rate satisfies at least one second condition to thereby provide access to at least one resource of the network interface to the plurality of data flows.

16. The processor of claim 15, wherein the one or more circuits are to cause at least one of the one or more physical meters to activate if at least one of the plurality of data flows satisfies at least one third condition.

17. The processor of claim 15, wherein the one or more circuits are to:

use the at least one physical rate limiter to reduce at least a rate of the one or more rates based at least part on the at least one second condition;

determine whether a second of the one or more rates obtained from a second physical meter monitoring a second data stream fails to satisfy the at least one second condition; and leave the second of the one or more rates unchanged based at least in part on the at least one second condition.

18. The processor of claim 15, wherein the one or more circuits are to cause the plurality of data flows to bypass the one or more physical meters and the at least one physical rate limiter if the total data rate does not satisfy the at least one first condition.

19. The processor of claim 15, wherein the network interface is to have a maximum data processing rate and the at least one physical rate limiter is to limit the at least one rate to a predetermined percentage of the maximum data processing rate.

20. The processor of claim 19, wherein the at least one first condition comprises a total flow threshold, and the network interface is to have a maximum data processing rate, and the total flow threshold is equal to or less than the maximum data processing rate.

21. The processor of claim 15, wherein the network interface is to have a maximum data processing rate and at least one of the one or more rates is reduced to at most a predetermined percentage of the maximum data processing rate.

22. The processor of claim 15, wherein the one or more physical meters comprises a plurality of physical meters, and a rate of each of the plurality of data flows is determined by a different one of the plurality of physical meters.

* * * * *